(12) United States Patent
Tetrault et al.

(10) Patent No.: US 10,808,366 B2
(45) Date of Patent: Oct. 20, 2020

(54) ENGINEERED SURFACES

(71) Applicant: Tatro Inc., Amelia, OH (US)

(72) Inventors: Christopher Tetrault, Amelia, OH (US); Michael Ayers, Alpharetta, GA (US); Jacob Tetrault, Alpharetta, GA (US)

(73) Assignee: Tatro Inc., Amelia, OH (US)

( * ) Notice: Subject to any disclaimer, the term of this patent is extended or adjusted under 35 U.S.C. 154(b) by 0 days.

(21) Appl. No.: 16/074,016

(22) PCT Filed: Jan. 30, 2017

(86) PCT No.: PCT/US2017/015670
§ 371 (c)(1),
(2) Date: Jul. 30, 2018

(87) PCT Pub. No.: WO2017/132683
PCT Pub. Date: Aug. 3, 2017

(65) Prior Publication Data
US 2019/0040593 A1 Feb. 7, 2019

Related U.S. Application Data

(60) Provisional application No. 62/287,967, filed on Jan. 28, 2016.

(51) Int. Cl.
| B32B 5/06 | (2006.01) |
| E01C 13/06 | (2006.01) |
| B32B 5/26 | (2006.01) |
| B32B 27/12 | (2006.01) |
| B32B 5/02 | (2006.01) |
| B32B 27/32 | (2006.01) |
| E01C 13/08 | (2006.01) |

(52) U.S. Cl.
CPC .............. *E01C 13/065* (2013.01); *B32B 5/02* (2013.01); *B32B 5/06* (2013.01); *B32B 5/26* (2013.01); *B32B 27/12* (2013.01); *B32B 27/32* (2013.01); *E01C 13/083* (2013.01); *B32B 5/022* (2013.01); *B32B 27/322* (2013.01)

(58) Field of Classification Search
CPC . B32B 27/12; B32B 2255/02; B32B 2255/10; B32B 2255/26; B32B 2307/726; B32B 2307/728
USPC ............. 472/85–87, 92; 428/212; 156/308.2; 405/129.75
See application file for complete search history.

(56) References Cited

U.S. PATENT DOCUMENTS

2009/0176422 A1* 7/2009 Patrick ................. D04H 1/4382
442/1
2014/0170916 A1* 6/2014 Krasnoff ................... E04C 5/07
442/58

FOREIGN PATENT DOCUMENTS

WO    WO 97/43480    * 11/1997

* cited by examiner

*Primary Examiner* — Kien T Nguyen
(74) *Attorney, Agent, or Firm* — Jenei LLC

(57) ABSTRACT

A moisture holding material for blending with fill to form an engineered surface. The moisture holding material includes a first non-woven fabric coated in an aqueous superabsorbent polymer (SAP); a second non-woven fabric; fiber; and a fluff material that are chopped and applied topically within a surface, on various substrates including, but not limited to, rubber, sand, wood chippings, grass, soil, fiber, textile, clay or rock. A portion of the non-woven material is coated with SAP.

20 Claims, 5 Drawing Sheets

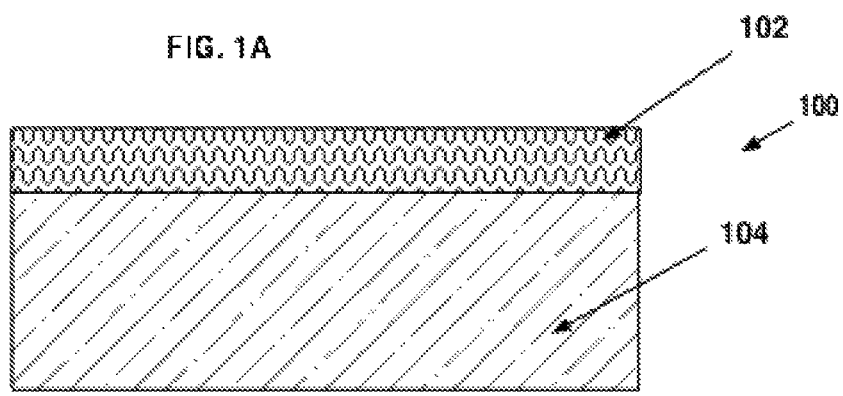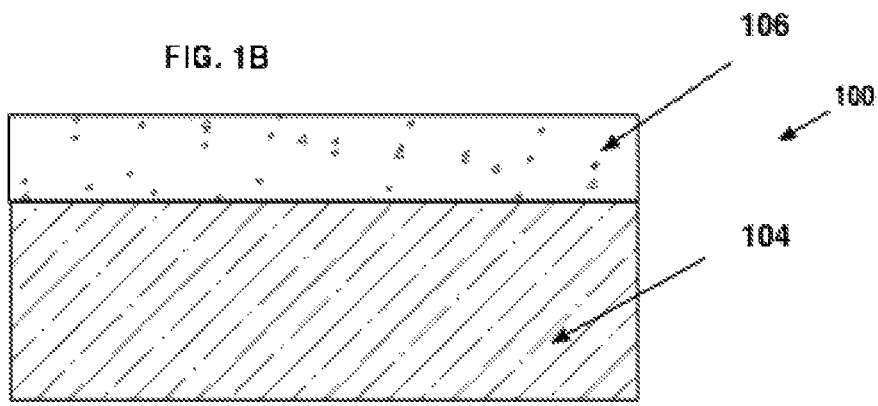

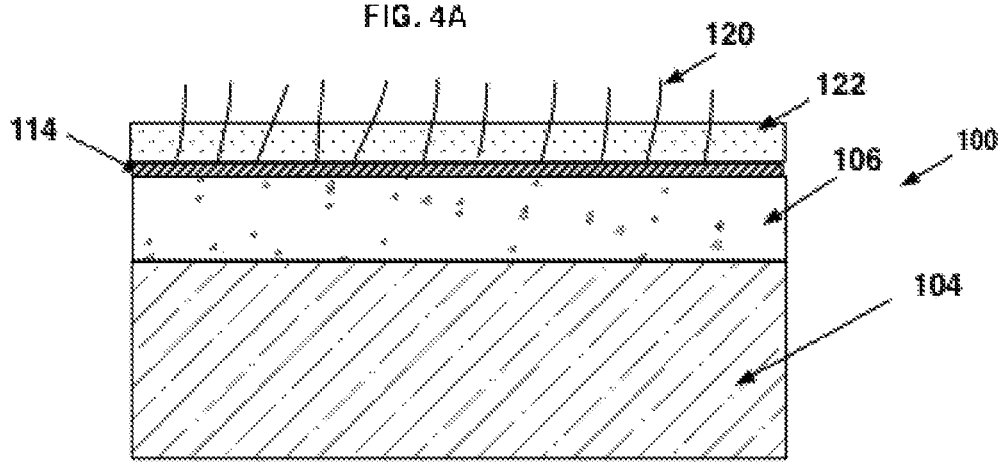
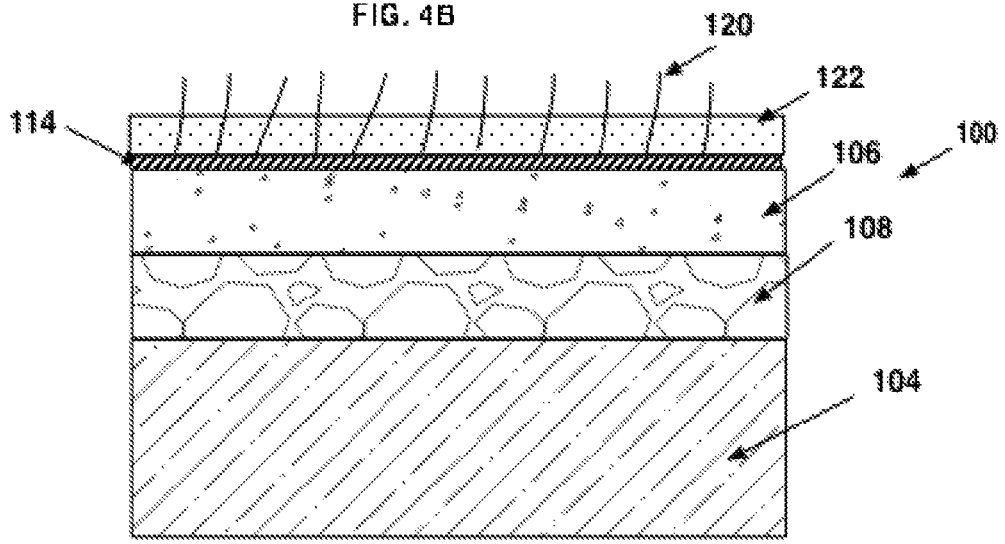

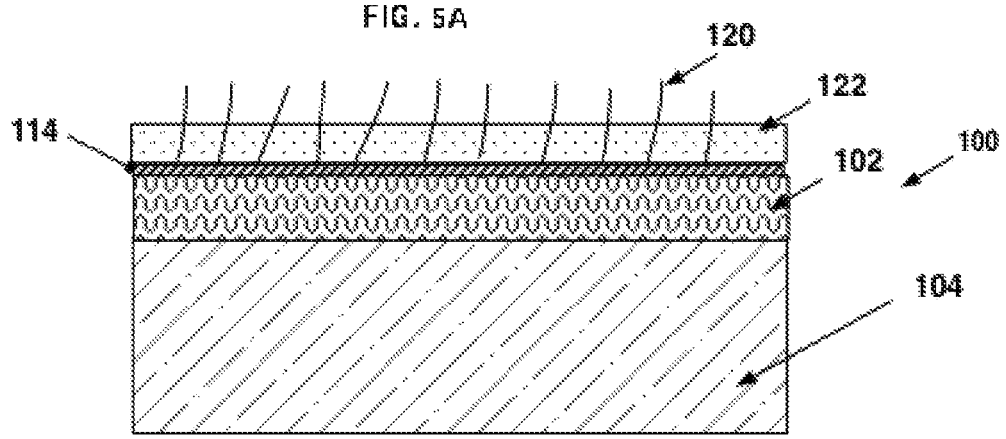
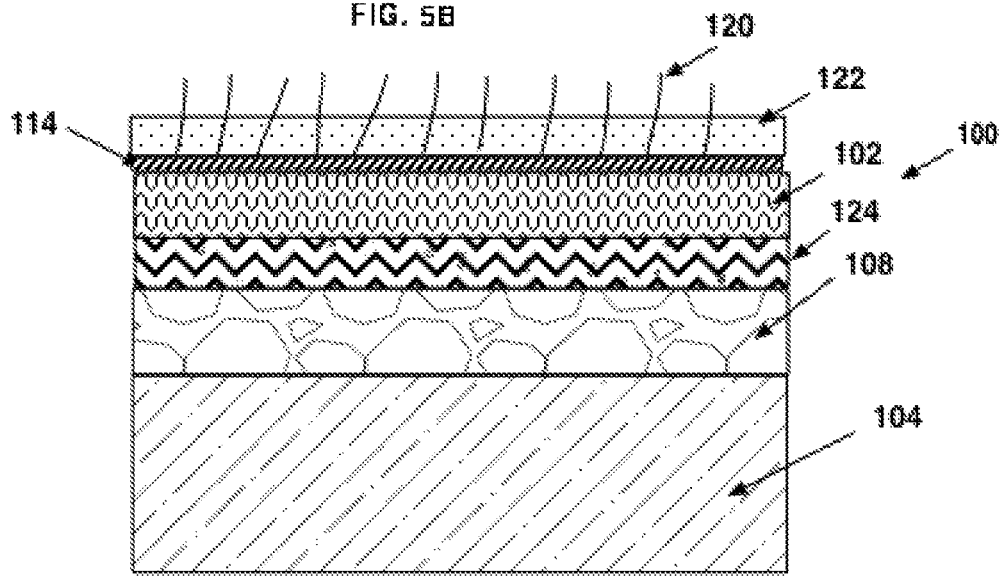

ENGINEERED SURFACES

CROSS-REFERENCE TO RELATED APPLICATIONS

The present application claims priority to provisional U.S. Patent Application No. 62/287,967, entitled "ENGINEERED RECREATIONAL AND SPORT SURFACES" and filed Jan. 28, 2016, and to PCT Application No. PCT/US17/15670 entitled "ENGINEERED SURFACES", filed Jan. 30, 2017, both of which are hereby expressly incorporated by reference herein.

FIELD OF THE PRESENT INNOVATION

The present disclosure generally relates to material that improves properties or an engineered surface in a soil or sand filled road, surface, substrate, arena or track.

BACKGROUND OF THE PRESENT INVENTION

Artificial surfaces are used throughout the world and in many different applications. For example, artificial surfaces can be used in arenas in the form of turf or playing surfaces for such sports as football, soccer, track and field and tennis to name just a few. In addition, there is another field where artificial surfaces are used, namely, in equestrian applications, such as racetracks, exercise areas and equestrian performance or training rings for horses and ponies. Depending upon the specific application and end use (sport, etc.), the composition and characteristics of the artificial surface will vary. For example, for the game of football or soccer, the artificial surface resembles natural grass, while for the sports of tennis and track and field, as well as resembling turf, the surface is a more hardened surface, such as a dirt surface, clay surface, etc. As a result of the widespread use in many different applications, there are numerous artificial surfaces on the market.

For instance, U.S. Pat. No. 5,326,192 to Freed, which is hereby incorporated in its entirety by reference, teaches a method of improving a turf surface by adding about 0.1 to 0.5 percent by weight of synthetic fibers into areas that contain turf or soil such that the synthetic fibers anchor the turf beneath the surface and mix with the turf above the surface. Similarly, Freed has invented two other soil reinforcement methods; U.S. Pat. Nos. 4,790,691 and 4,867,614, both to Freed, which are hereby incorporated in their entirety by reference, disclose the reinforcement of soil by mixing together soil and about 0.1 to 0.5 percent by weight of man-made fiber forming substances and/or fiberglass ('614) or thermoplastic polymers and/or fiberglass ('691).

U.S. Pat. No. 4,501,420 to Dury, which is hereby incorporated in its entirety by reference, discloses a method of making a sport surface by laying at least one flexible, water-permeable material containing sand on a water-permeable surface and placing a sheet or resilient material on top of it.

U.S. Pat. No. 4,819,933 to Armond, which is hereby incorporated in its entirety by reference U.S., discloses a sport surface comprising a layer of sand mixed with less than 1.0% by weight of long synthetic fibers, which is laid on top of a prepared drainage base. The Armond surface requires copious amounts of water on a frequent basis in order to prevent the surface from drying out and becoming hard and non-resilient.

U.S. Pat. No. 5,041,320 to Meredith et al., which is hereby incorporated in its entirety by reference, teaches a sport surface which comprises a pile fabric and a layer of rubber coated mineral grains (e.g., sand) in which the pile is partly submerged. U.S. Pat. No. 4,337,283 to Haas, Jr., which is hereby incorporated in its entirety by reference, discloses a synthetic turf playing surface, which comprises a subsurface layer (e.g., concrete, clay, dirt, etc.), a moisture barrier layer, a pile fabric layer and a compacted top-dressing layer.

Notwithstanding the aforementioned advancements in sport surfacing, there remains a need for a sport and recreational surface and subsurface, which is stable, manages available moisture while not degrading due to water, easily drained, easily and inexpensively manufactured, resistant to compaction, and hard enough to provide resistance, yet resilient enough to also provide a cushion. In other words, the surfaces and subsurfaces can provide desired shock attenuation for different activities depending on the needs and specifications of the application.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1A is a schematic cross-sectional view of a first example of the engineered surface according to the invention;

FIG. 1B is a further schematic cross-sectional view of a second example of the engineered surface according to the invention;

FIG. 4A is a schematic cross-sectional view of a seventh example of the engineered surface according to the invention;

FIG. 4B is a further schematic cross-sectional view of an eighth example of the engineered surface according to the invention;

FIG. 5A is a schematic cross-sectional view of a ninth example of the engineered surface according to the invention; and FIG. 5B is a further schematic cross-sectional view of a tenth example of the engineered surface according to the invention.

DETAILED DESCRIPTION

Figure 2A:
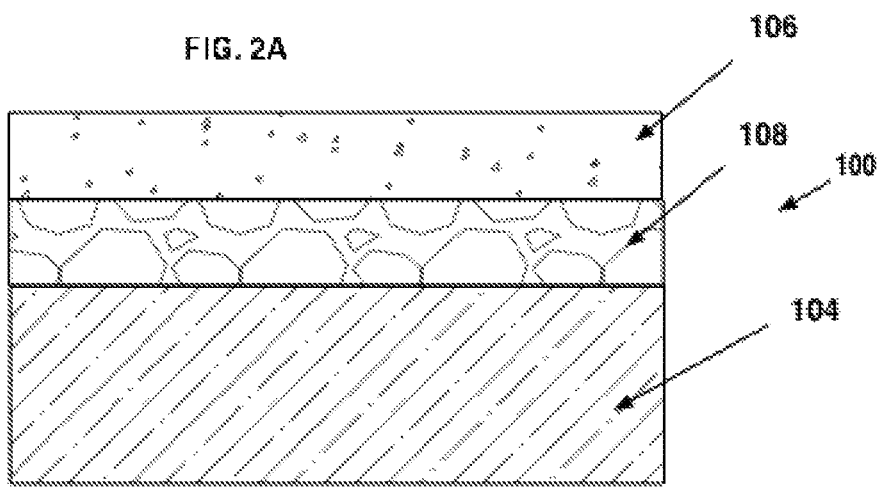
FIG. 2A is a schematic cross-sectional view of a third example of the engineered surface according to the invention.

The present innovation relates to recreation and sports surfaces, and in particular, relates to a loose, particulate mixture that can be applied to an underlying surface or layer to provide a recreation and sport surface, such as running, walking and jumping surfaces particularly suited for use in racetracks, exercise areas and equestrian performance or training rings for horses and ponies, as well as, jogging trails, paths and running areas for humans, canines and vehicles such as hiking trails and logging roads as well as unpaved roads.

In one embodiment of the present invention provides for a material and method for rapid rehabilitation of playing fields, tracks, arenas, and other sports surfaces and facilities at venues relying on underlying soil conditions. The invention may be applied to industrial grounds, unpaved residential paths, or sports venues. Playing fields, arenas, and the like may be constructed to host baseball, softball, horse racing, rodeo, other equestrian sports, dog racing, motor spots, golf, volleyball, football, soccer, cycling, jogging, track and field or other sports.

In a more specific aspect, the present disclosure relates to such compositions having an ability to absorb, retain and release moisture, particularly water, which enables these compositions to be useful and effective in many applications.

The term "sand" refers to any granular material formed by the disintegration of rocks to form particles smaller than gravel but coarser than silt. The sand employed in the manufactured surface composition may be of any common type or grade, such as silica sand, with the choice determined by availability and cost. In a specific embodiment, the sand may be dried or pre-heated to dry it before the mixing step. The average particle size (in diameter) of the sand may vary widely. In one embodiment, the sand will pass substantially through a number 7 U.S. mesh screen while being retained substantially on a number 200 U.S. mesh screen. In one or more embodiments, the sand is ASTM C33 all-purpose sand that ranges in size from about 4.75 mm to about a #200 sieve.

Two geometrical parameters are used to describe the shape of sand grains, namely roundness and sphericity. Roundness is the measure describing the sharpness of a grain's corners and edges, regardless of shape. A perfect rounded particle would have the roundness=1, all the others being included in different roundness classes: well rounded (roundness value between 0.60-1.00), rounded (0.40-0.60), subrounded (0.25-0.40), subangular (0.15-0.25), 0.25), angular (0.00-0.15), and very angular (class reserved for grains with extremely sharp edges). For a base, the preferred sand particle is subrounded, subangular or mixture thereof. In a more preferred embodiment, sand base particle is subangular. Sphericity is a measure of the degree to which the shape of a particle approaches that of a sphere. A perfect spherical grain would have the sfericity factor=1 but this is rather uncommon in nature as most sand grains have sphericity numbers around 0.7

The term "fiber(s)" refer to any ribbons, strips or fragments of material used to, inter alia, add mechanical strength, resiliency or color(s) to the manufactured surface.

The term "non-woven fabric(s)" refers to any natural or polymer based fabric, including, but not limited to the following: polyethene (PE), polypropene (PP), polyester (PET), polyurethane, polyolefin, nylon, polyvinyl chloride (PVC), polystyrene (PS), Teflon, para aramid, polyamide. Alternatively, a fabric can be used formed of a natural non-woven cotton, etc. There are different ways of making non-woven known to those skilled in the art, e.g., Drylaid, Airlaid, Spunmelt, Spunlaid, Wetlaid. There are many production methods known to coat a non-woven with an aqueous formulation For example: Slot die coating, Fluidized Bed, General Dip and Bathe methods, 'The Meyer (Mayer) Rod Coating" method, Gravure/roll in pan method. The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

The terms "fabric blend" or "SAP fabric blend" refer to a blend of fabric and/or fiber materials comprising one or more materials selected from the group consisting of nonwoven fiber materials; polymeric materials, including staple fibers, filaments and particles; and fluff, which resembles cotton like material (generally a fibrous mass of natural and/or synthetic fibers, intertwined and entangled to form a cohesive unit of fibers and held together by interfacial friction and surface energy) wherein at least a portion of one or more of the materials are coated with a super absorbent polymer (SAP).

The terms "recreational surface(s)", "sport surface(s)" and "engineered surface(s)" refer to engineered earthen recreation and sports surfaces as described herein. Unlike natural track surfaces and some artificial surfaces, the compositions of the invention require minimal irrigation, thereby reducing the cost of water, machinery and manpower resources. Furthermore, the surface requires relatively little maintenance such as grading and harrowing. Also, the excellent drainage properties reduce the likelihood of injuries to athletes or animals that run on the surface. The manufactured surface may be used for horse race courses, jumping arenas, training tracks, indoor and outdoor arenas, and other equestrian facilities. The manufactured surface may also be used for recreational purposes such as jogging trails, paths, and running areas for human, animals, automobiles, motorcycles and the like. Depending upon the specific application and end use (sport, etc.), the composition and characteristics of the artificial surface will vary. For example, for the game of football or soccer, the artificial surface resembles natural grass, while for the sports of tennis and track and field, the surface is a more hardened surface, such as a dirt surface, clay surface, etc.

In one or more embodiments, the engineered surface is a surface created for erosion control application such as for hillsides to increases physical properties (strengthen). In one or more embodiments, the engineered surface is a mix with any soil type such as for use with existing field or sub-base.

The terms "recreational surface blend", "engineered surface blend", or "surface material blend" refer to a blend of the SAP fabric blend blended with at least a portion of one or more materials selected from the group consisting of granules of stone, gravel, sand, asphalt, cement, ceramic beads, soil, clay, diatomaceous earth, perlite, silica, organic minerals, rubber or combinations thereof. According to an embodiment of the present innovation, the components employed in the engineered surface blend may be a combination of any natural and/or synthetic materials, such as natural or manufactured nonwovens, fiber products, rubber particles, sand, and a SAP. Additionally, the components may be colored to add any desired color(s) to the manufactured surface.

The term "top dressing" refers to a material placed over the top surface of a substrate such as a sport or recreational surface. A top dressing may consist of a fabric blend, recreational surface blend or may comprise a natural soil or a synthetic soil or may be a mix of natural soil or synthetic soil with conventional infill material, such as resilient particles, mineral particles or other types of infill materials. Synthetic soil, such as disclosed in U.S. Pat. No. 4,826,350, which is incorporated herein by reference, may comprise natural soil constituents, fine sand for regulating particle size, synthetic resin emulsions for regulating compression strength and soil agglomerating agents for regulating the bending strength of the synthetic soil surface. The top dressing may also consist of humus, sand, fertilizer or other natural or synthetic ingredients. A top dressing is generally applied at a rate of approximately ⅛" to 1" layer over the surface of the soil or substrate.

The term "lofting material(s)" and "lofting agent(s)" refer to various fill materials that are resilient, pliable, stretchable, and/or expandable that are added in order to add fill to the base materials. Lofting agents include fabric, textile, rubber/plastic products, fiber products, and wood products. In one or more embodiments, one or more lofting agents can be added to the surface.

The term "rubber product(s)" refers to a wide variety of rubber and plastic products, which are available for use as lofting agents. These include crumb rubber (made from recycled tires) but also include ground sneakers or tennis balls, shredded surgical rubber, and stripped electrical wire casings. Rubber lofting agents provide additional cushioning and many (the crumb rubbers in particular) help retain moisture by some of the material "floating" to the top of the sand to keep moisture in. Darker colored materials also absorb heat from the sun and help in cold weather.

The terms "fiber product(s)" and "fabric product(s)" refer to fabric and fiber based lofting agents include synthetic felt ground into small pieces and short fibers, including carpet fibers.

The term "wood product(s)" refers to a wide variety of wood-based products including sawdust, chips and shredded material, which vary in size and texture. Peat moss is another wood product that may be used as an additive.

The term "geotextile(s)" refers to vegetation and support layers according to the invention, which may be woven or non-woven fabrics, as are generally employed as filtration and separation devices. Geotextiles are mostly of plastics, natural materials such as e.g. hemp, cotton or coconut fiber, glass fibers, rock wool, because of their great variety, may more readily be adapted to soil material conditions, e.g. in order to prevent blockage/clogging of the surface by fine components and thus prevent a reduced water- and air permeability.

The term "substrate(s)" refers to an existing soil, for example an agricultural soil or other earthen or soil-based surface. In one or more embodiments, the soil-based substrate includes one or more of a soil substrate, a topsoil substrate, a subsoil substrate, a potting soil substrate, a mud substrate, a clay substrate, a sand substrate, a gravel substrate, a rock substrate, a stone substrate, a concrete substrate, a cement substrate, and an asphalt substrate. In any of the above embodiments, the soil-based substrate may further include a surface, the surface having one or more of dust particles, saw dust particles, rock dust particles, silicate dust particles, organic particles, bacteria particles, mold particles, mildew particles, spore particles, dirt particles, soil particles, rock particles, stone particles, sand particles, asbestos particles, metal particles, fiber particles and insulation particles.

The terms "drainage underlayer", "base", "gravel base", and "aggregate layer(s)" refers to a crushed stone base directly under the engineered surface to provide support and drainage. A geotextile fabric or impermeable liner may be placed directly on the stone base to prevent intermixing of materials. It may be desirable to place a porous aggregate layer, preferably formed with selectively sized crushed rocks, between the supporting substrate and the recreational surface so that water is enabled to be drained through the spacing device into the porous aggregate layer.

By "growth medium", "growing medium" or "plant propagation material" is meant any material in which the plants are rooted. Growing medium may be an organic material and in particular a natural soil such as peat. However, it will be appreciated that the growing medium may also include inorganic or organic fillers such as conventionally used. For example any type of soil as understood by one of skill in the agricultural arts. In one or more embodiments, the term growth medium is meant to encompass any plant material capable of growing into full plant, and may include, for example, natural or artificial seeds, plant material containing an embryo, totipotent cells, pluripotent cells or meristematic cells, asexual plant propagation material, such as scion cuttings such as stems tip cuttings, medival cuttings, cane cuttings, single eye cuttings, double eye cuttings, heel cuttings, leaf cuttings such as whole leaf with petiole, whole leaf without petiole, split vein, leaf sections, root cuttings, eye cuttings, air or ground layering such as tip layering, simple layering, compound layering, mound layering, division, tubers, bulbs, corms, rhizomes, stolons or runners, twin-scaling offsets, separation, grafts such as bud grafts, whip and tongue graft, cleft grafting, bark grafting, patch budding, chip budding, t-budding, and plant micropropagation material such as plant tissue culture and somatic embryonic material.

"Plant" as used herein includes all members of the plant kingdom, particularly including higher (or "vascular") plants in the divisions Filicinae, Gymnospermae (or "gymnosperm"), and Angiospermae (or "Angiosperm"). Thus "plant" or "vegetation" as used herein includes, but is not limited to, a crop plant, a turf grass, an ornamental species, a species grown for timber or pulp, a species grown for biofuels or species grown for pharmaceuticals. Additionally, plants for propagation in the present invention include, but are not limited to, tobacco, tomato, potato, sugar beet, pea, carrot, cauliflower, broccoli, soybean, canola, sunflower, alfalfa, cotton, rapeseed, Arabidopsis, peach, pepper, apple, chile, peanut, orange, grape, coffee, cassaya, spinach, lettuce, cucumber, wheat, maize, rye, rice, turfgrass, oat, barley, sorghum, millet, sugarcane, or banana Accordingly, it is an aspect of the present innovation to provide an engineered surface that improves over the prior art surfacing compositions having a cooling mechanism by evaporation of water.

It is a further aspect of the present innovation to provide an engineered surface that comprises aqueous super absorbent polymer compositions having an ability to absorb moisture, particularly water. This moisture-absorbing feature renders the compositions of the present innovation useful and effective in many applications.

It is a further aspect of the present innovation to provide a stable and improved substrate that can be used in a number of engineered surfaces as well as improved soil substrate characteristics in terms of cooling, shock absorption, shear resistance, dust control, and cohesion.

In another aspect, the present innovation provides for a reduction in the cost for a surface substrate base. Once compacted, the fiber (carpet fibers alone, polymer based fibers mixed with SAP, Polymer based fibers alone, SAP textile alone, etc.) blend; the overall strength of the fiber/SAP system will provide a more efficient and cost effective base for roads, synthetic turf, houses and other uses.

In another aspect, the present innovation provides for a vegetative support system. In one embodiment, the present invention provides for a synthetic root system having a calibrated moisture management, which provides for a more efficient and cost effective environment for vegetation to flourish. The synthetic root system provides for better aeration, stronger root system for the plants, and reduces water logging of plants by providing sufficient, calibrated moisture to meet the plant needs.

The invention provides an environmentally safe, non-toxic, and non-irritating manufactured surface that may be used as a sport and recreational surface. More specifically, the manufactured surface may be used for horse race courses, jumping arenas, training tracks, indoor and outdoor arenas, and other equestrian facilities. The invention creates an ideal equestrian footing that reduces shock and provides cushioning to the feet of running and jumping horses, while still providing sufficient resistance to their rear legs so that they may increase and maintain their speed. The surface is stable, non-slip, dust-resistant, water-resistant and easily drained. Unlike natural track surfaces and some artificial surfaces, the compositions of the invention require minimal irrigation, thereby reducing the cost of water, machinery and manpower resources. Furthermore, the surface requires relatively little maintenance such as grading and harrowing. Moreover, the surface disclosed herein will be available for use more often than conventional surfaces during the rainy season. Also, the excellent drainage properties reduce the likelihood of injuries to athletes or animals that run on the surface. The manufactured surface may also be used for recreational purposes such as arenas, athletic fields, play fields, gaming fields, sport courts, roads, stalls and barns, jogging trails, paths, and running areas for humans, animals, automobiles, bicycles, motorcycles and the like.

The aqueous super absorbent polymer compositions of one or more embodiments can also contain a super absorbent polymer that is in particulate form.

It is still another aspect the present innovation to provide an engineered surface which may be prepared over a variety of surfaces including sand cement, dirt, clay, turf and the like.

According to one or more embodiments, a composition for use in creating a sport or recreational surface is provided that includes a SAP fabric blend comprising one or more materials selected from the group consisting of non-woven fiber materials; polymeric materials, including staple fibers, filaments and particles; and fluff, which resembles cotton like material (generally a fibrous mass of natural and/or synthetic fibers, intertwined and entangled to form a cohesive unit of fibers and held together by interfacial friction and surface energy) wherein at least a portion of one or more of the materials are coated with a super absorbent polymer (SAP).

According to one embodiment, a moisture holding material for blending with fill to form an engineered surface is provided that comprises at least 40 wt. % nonwoven fabric materials and from about 1 wt. % to about 10 wt. % of a superabsorbent polymer (SAP), wherein the nonwoven fabric is provided as cut pieces and wherein at least a portion of nonwoven materials are coated with the super absorbent polymer (SAP), the percentage by weight of each ingredient being based on the total weight of the composition. In one or more embodiments of the present innovation, the superabsorbent polymer comprises from about 1 wt. % to about 7.5 wt. % of the material. In one or more embodiments of the present innovation, the superabsorbent polymer comprises from about 1 wt. % to about 5 wt. % of the material. In one or more embodiments of the present innovation, the superabsorbent polymer comprises from about 1.5 wt. % to about 4.5 wt. % of the material. In one or more embodiments of the present innovation, the superabsorbent polymer comprises from about 2 wt. % to about 3.5 wt. % of the material.

According to another embodiment, a moisture holding material for blending with fill to form an engineered surface is provided that comprises at least 40 wt. % nonwoven fabric materials; at least 15 wt. % fibers; and from about 0.5 wt. % to about 10 wt. % of a superabsorbent polymer (SAP), wherein the nonwoven fabric is provided as cut pieces and wherein at least a portion of materials are coated with the super absorbent polymer (SAP), the percentage by weight of each ingredient being based on the total weight of the composition. In one or more embodiments of the present innovation, the superabsorbent polymer comprises from about 1 wt. % to about 10 wt. % of the material. In one or more embodiments of the present innovation, the superabsorbent polymer comprises from about 1 wt. % to about 7.5 wt. % of the material. In one or more embodiments of the present innovation, the superabsorbent polymer comprises from about 1 wt. % to about 5 wt. % of the material. In one or more embodiments of the present innovation, the superabsorbent polymer comprises from about 1.5 wt. % to about 4.5 wt. % of the material. In one or more embodiments of the present innovation, the superabsorbent polymer comprises from about 2 wt. % to about 3.5 wt. % of the material.

According to another embodiment, a moisture holding material for blending with fill to form an engineered surface is provided that comprises at least 40 wt. % nonwoven fabric materials; at least 30 wt. % fibers; and from about 0.5 wt. % to about 10 wt. % of a superabsorbent polymer (SAP), wherein the nonwoven fabric is provided as cut pieces and wherein at least a portion of materials are coated with the super absorbent polymer (SAP), the percentage by weight of each ingredient being based on the total weight of the composition. In one or more embodiments of the present innovation, the superabsorbent polymer comprises from about 1 wt. % to about 10% wt. % of the material. In one or more embodiments of the present innovation, the superabsorbent polymer comprises from about 1 wt. % to about 5 wt. % of the material. In one or more embodiments of the present innovation, the superabsorbent polymer comprises from about 1.5 wt. % to about 4.5 wt. % of the material. In one or more embodiments of the present innovation, the superabsorbent polymer comprises from about 2 wt. % to about 3.5 wt. % of the material.

According to another embodiment, a moisture holding material for blending with fill to form an engineered surface is provided that comprises at least 40 wt. % nonwoven fabric materials; up to 30 wt. % fibers; up to 30 wt. % nonwoven fluff, and from about 1 wt. % to about 10 wt. % of a superabsorbent polymer (SAP), wherein the nonwoven fabric is provided as cut pieces and wherein at least a portion of the materials are coated with the super absorbent polymer (SAP), the percentage by weight of each ingredient being based on the total weight of the composition.

In one or more embodiments of the present innovation, the superabsorbent polymer comprises from about 1 wt. % to about 10% wt. % of the material. In one or more embodiments of the present innovation, the superabsorbent polymer comprises from about 1 wt. % to about 5 wt. % of the material. In one or more embodiments of the present innovation, the superabsorbent polymer comprises from about 1.5 wt. % to about 4.5 wt. % of the material. In one or more embodiments of the present innovation, the superabsorbent polymer comprises from about 2 wt. % to about 3.5 wt. % of the material.

According to another embodiment, a moisture holding material for blending with fill to form an engineered surface is provided that comprises at least 40 wt. % nonwoven fabric materials; from 15 wt. % to 30 wt. % fibers; from 15 wt. % to 30 wt. % nonwoven fluff, and from about 1 wt. % to about 10 wt. % of a superabsorbent polymer (SAP), wherein the nonwoven fabric is provided as cut pieces and wherein at least a portion of materials are coated with the super absorbent polymer (SAP), the percentage by weight of each ingredient being based on the total weight of the composition. In one or more embodiments of the present innovation, the superabsorbent polymer comprises from about 1 wt. % to about 7.5 wt. % of the material. In one or more embodiments of the present innovation, the superabsorbent polymer comprises from about 1 wt. % to about 5 wt. % of the material. In one or more embodiments of the present innovation, the superabsorbent polymer comprises from about 1.5 wt. % to about 4.5 wt. % of the material. In one or more embodiments of the present innovation, the superabsorbent polymer comprises from about 2 wt. % to about 3.5 wt. % of the material.

While the nonwoven fabric can be provided in any number of different sizes (dimensions) and shapes so long as they are suitable for use for the intended purpose, exemplary nonwoven fabric components can be about ½" pieces. The nonwoven fabric pieces can come in various shapes and typically, the nonwoven fabric pieces that are used have irregular cut shapes and come in different sizes. For example, the width can be from about ⅛ inch to about 2½ inches and the length can be between about ⅛ inch to about 2½ inches. In one or more embodiments, the width can be from about ½ inch to about 2 inches and the length can be between about ½ inch to about 2 inches. In one or more embodiments, the width can be from about 1 inch to about 1½ inches and the length can be between about 1 inch to about 1½ inches. In one or more embodiments, the width can be from about ⅛ inch to about 2½ inches and the length can be between about ⅛ inch to about 2½ inches. In one embodiment, the nonwoven fabric materials can come in any number of geometric shapes.

In one embodiment, the nonwoven fabric materials can come in any number of different forms, including fibers, knits, pellets, particles, etc., that are suitable for mixing with sand. In another embodiment, the nonwoven fabric materials are chopped pieces of a knit fabric and fibers. In another embodiment, the nonwoven fabric materials are polyester or other synthetic polymers materials.

The nonwoven material can be provided in any number of different forms including but not limited to fibers and knit fabrics that are then processed to form small pieces thereof or a combination of both that can be mixed with the other components. In accordance with the present invention, the material that is added to the sand and superabsorbent polymer is in the form of pieces of a synthetic knit fabric and/or synthetic fibers. Suitable polyester knit fabric and polyester fibers can be obtained from any number of different commercial sources.

The natural and/or manufactured fibers that may be suitable in the practice of the invention comprise a variety of chopped, shredded and/or cut fibers, described in detail below. These fibers may be commercially available from a variety of sources. The fibers may be straight or curly and have a length in the range of about ¼ inches to about 6 inches, and more particularly have a length in the range of about ½ inches to about 2 inches. Additionally, the fibers may have a thickness in the range of about 1/48 inches to about ¼ inches, and more particularly, have a thickness in the range of about 1/32 inches to about ⅛ inches. Examples of various manufactured fibers suitable for the manufactured surface of the invention may include without limitation rayon, acetate, nylon, modacrylic, olefin, acrylic, polyester, PLA, vinyon, saran, spandex, vinalon, aramid, nomex, Kevlar, modal, PBI, sulfar, lyocell, zylon, dyneema/spectra, rubber and acrylontrile rubber.

In one or more embodiments of the invention, the fibers are between 0.1-3 inches long. In another embodiment of the invention, the fibers are between 0.5-2 inches long.

In one or more embodiments of the invention, the average length of the fibers is greater that 2, 3, 4, 5, 10, 15 or 20 mm and less than 250, 200, 150, 125, 100, 75 or 50 mm.

The fibers of the present invention are generally polymer-based, e.g., acetate, acrylontrile rubber, acrylic, dyneema/spectra, fiberglass and synthetic and nonsynthetic fiber blends, Kevlar, lyocell, modacrylic, modal, nomex, nylon, olefin, para-aramid, polyacryl, polyacrylonitrile (PAN), polyamide, polyester, polyethylene (PE), polyethylene terephthalate (PET), polylactic acid (PLA), polyolefin, polyphenylene sulfide, polypropylene, polystyrene (PS), polyurethane, polyvinyl chloride (PVC), PTFE (Teflon®), rayon, rubber, saran, spandex, sulfar, vinal, vinalon, vinylal, vinyon, viscose, zylon and any combination thereof.

The fibers of the present invention may also include natural materials. The natural fibers suitable for use in the invention may include vegetable fibers, animal fibers, and/or mineral fibers or any fibers having similar properties. Vegetable fibers may generally comprise cellulose and may include coconut fibers, palm fibers, cane fibers, cotton, linen, jute, flax, ramie, sisal, agave, bast, kapok, kenaf, ramie, rattan, soybean, vine, bamboo, grass, and hemp. Animal fibers may include wool, goat hair, horse hair, and silk fiber. Mineral fibers are naturally occurring fibers or slightly modified fibers procured from minerals. Mineral fibers include without limitation asbestos, serpentine, amphiboles, amosite, crocidolite, tremolite, actinolite, anthophyllite, ceramic, glass fibers (i.e., glass wool and quartz), aluminum oxide, silicon carbide, boron carbide and aluminum fibers.

Acrylic is a manufactured fiber where the fiber-forming substance is any long chain synthetic polymer composed of less than about 85% but at least about 35% by weight of acrylonitrile units. Polyester is a manufactured fiber where the fiber-forming substance is any long chain synthetic polymer composed of at least about 85% by weight of an ester of a substituted aromatic carboxylic acid, including without limitation to substitute terephthalate units and para substituted hydroxyl-benzoate units. The fiber may be formed by the interaction of about 2 or more chemically distinct polymers (of which non exceeds about 85% by weight), and contains ester groups as the dominant functional unit (at least about 85% by weight of the total polymer content of the fiber), and which, if stretched at least about 100%, durably and rapidly substantially reverts to its unstretched length when the tension is removed. Alternatively, the term elasterall-p may be used as a generic description of the fiber.

In one or more embodiments, the manufactured surface includes polyester fibers in an amount in the range of about 1% to about 15% by weight of the total composition. In another embodiment, the manufactured surface includes polyester fibers in an amount in the range of about 1% to about 10% by weight of the total composition. In particular, the polyester fibers may have a length in the range of about ½ inch to about 6 inches, and specifically may be cut to a length of about 1 inch. Addition of polyester fibers to the manufactured surface composition of this invention unexpectedly improves the overall stability of the manufactured surface.

Rayon is a manufactured fiber composed of regenerated cellulose, as well as manufactured fibers composed of regenerated cellulose where substituents have replaced not more than about 15% of the hydrogens of the hydroxyl groups. Additionally, the fiber may be composed of cellulose precipitated from an organic solution in which no substitution of the hydroxyl groups takes place and no chemical intermediated are formed.

Acetate is a manufactured fiber in which the fiber-forming substance is cellulose acetate. The term triacetate may be used as a generic description of the fiber when not less than about 92% of the hydroxyl groups are acetylated. Saran is a manufactured fiber where the fiber-forming substance is any long chain synthetic polymer composed of at least about 80% by weight of vinylidene chloride units. Azlon is a manufactured fiber is a manufactured fiber where the fiber-forming substance is composed of any regenerated naturally occurring proteins. Nytril is a manufactured fiber containing at least about 85% of a long chain polymer of vinylidene dinitrile where the vinylidene dinitrile content is no less that every other unit in the polymer chain. Nylon is a manufactured fiber where the fiber-forming substance is a long-chain synthetic polyamide in which less that about 85% of the amide linkages are attached directly to two aromatic rings. Nylon is a manufactured fiber in which the fiber-forming substance is a long-chain synthetic polyamide in which less than about 85 percent of the amide linkages are attached directly to two aromatic rings. Vinal is a manufactured fiber where the fiber-forming substance is any long chain synthetic polymer composed of at least about 50 percent by weight of vinyl alcohol units and such that the total of the vinyl alcohol units and any one or more of the various acetal units is at least about 85 percent by weight of the fiber.

Olefin is a manufactured fiber in which the fiber-forming substance is any long chain synthetic polymer composed of at least about 85 percent by weight of ethylene, propylene, or other olefin units, except amorphous (noncrystalline) polyolefins. The term lastol may be used when the fiber-forming substance is a cross-linked synthetic polymer, with low but significant crystallinity, composed of at least about 95 percent by weight of ethylene and at least one other olefin unit, and the fiber is substantially elastic and heat resistant. Vinyon is a manufactured fiber where the fiber-forming substance is any long chain synthetic polymer composed of at least about 85 percent by weight of vinyl chloride units. Metallic fiber (Lurex Company Limited) is a manufactured fiber composed of metal, plastic-coated metal, metal-coated plastic, or a core completely covered by metal. Anidex is a manufactured fiber where the fiber-forming substance is any long chain synthetic polymer composed of at least 50 percent by weight of one or more esters of a monohydric alcohol and acrylic acid. Novoloid is a manufactured fiber containing at least about 85 percent by weight of a cross-linked novolac. Aramid (Dupont Company, Delaware) is a manufactured fiber in which the fiber-forming substance is a long-chain synthetic polyamide such that at least about 85 percent of the amide linkages are attached directly to two aromatic rings. Examples of materials produced from aramid fibers include without limitation, Kevlar and Nomax.

Sulfar (Toray Industries, Inc. Japan) is a manufactured fiber in which the fiber-forming substance is a long chain synthetic polysulfide in which at least about 85% of the sulfide linkages are attached directly to about two (2) aromatic rings. PBI (Celanese Corporation) is a manufactured fiber where the fiber-forming substance is a long chain aromatic polymer having reoccurring imidazole groups as an integral part of the polymer chain. Elastoester is a manufactured fiber where the fiber-forming substance is a long-chain synthetic polymer composed of at least about 50% by weight of aliphatic polyether and at least about 35% by weight of polyester. Melamine is a manufactured fiber where the fiber-forming substance is a synthetic polymer composed of at least about 50% by weight of a cross-linked melamine polymer.

Fluoropolymer is a manufactured fiber containing at least about 95% of a long-chain polymer synthesized from aliphatic fluorocarbon monomers. PLA is a manufactured fiber in which the fiber-forming substance is composed of at least about 85% by weight of lactic acid ester units derived from naturally occurring sugars. Examples of fluorpolymers may include without limitation, PTFE (Teflon®), PFA (also known as Teflon®), FEP (also known as Teflon®), ETFE (Tefzel®), Fluon®, ECTFE (Halar®), PVDF (Kynar®), PCTFE (Kel-F®), TFE, FPM, CTFE, FFKM (Kalrez®, Tecnoflon FFKM®), and FKM (Viton®, Tecnoflon®).

In one or more embodiments, the fibers are in the range of about 0.5% to about 10% by weight of total composition.

Engineered Surfaces

In one or more embodiments of the present innovation, an engineered earthen surface is provided in the form of a particulate composition for use as a sport or recreational surface comprising about 50-90 percent by weight of a substrate blend and about 10-50% by weight of a engineered surface material blend.

In the illustrated embodiment, the substrate will have an effective working depth of a half-inch to 10 inches. In one embodiment, the substrate will have an effective working depth of a half-inch to 8 inches. In another embodiment, the substrate will have an effective working depth of 1 to 6 inches. In another embodiment, the substrate will have an effective working depth of 2 to 5 inches.

Also as mentioned above, the substrate may comprise gravel, sand, grit, slag, vermiculite, zeolite, haydite, stalite perlite, or mixtures thereof and may be mixed with engineered surface material blend in order to provide hydration absorption and holding due to the moisture capacity of the treated engineered surface material. Sand has been shown to be of a size to function well for very effective distribution in an engineered surface environment.

According to one embodiment, a composition for use as a sport or recreational surface includes: greater than about 10, 20, 30, 40, 50, 60, 70 percent by weight or more of a sand; at least about 1, 2, 3, 4, 5, 6, 7, 8, 9, 10 or more percent by weight of a super absorbent polymer (SAP), with the balance being made up of one or more materials selected from the group consisting of non-woven fiber materials; polymeric materials, including fibers and particles; and fluff, the percentage by weight of each ingredient being based on the total weight of the composition.

According to one embodiment, a composition for use as a sport or recreational surface includes: greater than about 50 percent by weight of a sand with the balance being made up of one or more materials selected from the group consisting of non-woven fabric materials; polymeric materials, including fibers and particles; and fluff, wherein one or more of the components of the surface is coated with a super absorbent polymer (SAP). In one embodiment, the non-woven fiber materials are coated with a super absorbent polymer (SAP).

Applicant has discovered that synergistic and unexpected results are obtained when the composition of the present innovation includes sand in a weight percent of greater than about 45% and preferably about 50% to about 95% and in a range of about 5-6 lbs. per square foot.

The engineered surface material blend in accordance with the invention may be disposed in a substrate layer and worked into the layer. In this use the substrate layer may have a depth of from about one inch to about five, and most typically about three inches. In one embodiment, the engineered surface material blend is dispersed in the range of 0.1 to 25 wt. percent with sand substrate, but is typically most functional and economical at about 0.2-15 wt. percent of the engineered surface material blend in the substrate material. In another embodiment, the engineered surface material blend is dispersed in the range of 0.2 to 10 wt. percent with sand substrate. In another embodiment, the engineered surface material blend is dispersed in the range of 0.25 to 8 wt. percent with sand substrate. In another embodiment, the engineered surface material blend is dispersed in the range of 0.5 to 6 wt. percent with sand substrate. In another embodiment, the engineered surface material blend is dispersed in the range of 0.5 to 2.5 wt. percent with sand substrate.

In another embodiment, the engineered surface material blend further comprises rubber in the range of about 1% to about 25% by weight. In another embodiment, the engineered surface material blend comprises rubber in the range of about 1% to about 15% by weight. In one or more embodiments, the rubber comprises a mixture of rubber particles from recycled tires, recycled ground industrial rubber or both. In one or more embodiments, the rubber comprises at least one material selected from the group consisting of a natural rubber, a synthetic "natural" rubber, a SBR, a neoprene rubber, a nitrile rubber, a butyl rubber, a hypalon rubber, an EP rubber, an urethane rubber, an epichlorohydrin rubber, a chlorinated polyethylene rubber, a polyvinyl chloride rubber, a polysulfide rubber, a silicon rubber, an acrylic rubber, a fluoroelastomer, a polyacrylic rubber, an EPM rubber, a tire fiber, a tire cord, and any combination thereof.

The fluff of the present invention is generally a fibrous mass of synthetic fibers, intertwined and entangled to form a cohesive unit of fibers and held together by interfacial friction and surface energy.

In accordance with the present innovation as embodied and broadly described herein, a method and apparatus are disclosed in one embodiment of the present innovation as including a material and method for rapid rehabilitation of playing fields, tracks, arenas, and other sports facilities at venues relying on underlying soil conditions. The present innovation may be applied to industrial grounds, unpaved residential paths, unpaved roads, hiking trails and logging roads, access roads or sports venues. Playing fields, arenas, and the like may be constructed to host baseball, softball, horse racing, rodeo, other equestrian sports, dog racing, motor spots, golf, volleyball, football, soccer, cycling, or other sports.

In one embodiment, all such may be treated by a soil amendment in accordance with the present innovation. A substrate may be formed of sand, rock, other inorganic material, or organic material, provided with a binder to temporarily or permanently secure a hydrating (e.g., hydrophilic) polymer such as polyacrylate, polyacrylamide (PAM) in proximity to the substrate. In certain embodiments, the resulting composition may be mixed into the soil close to the top surface.

The present innovation relates to a loose, particulate mixture that can be applied over an easily drained underlayer or base surface to provide a sport and recreational surface. More specifically, the present innovation provides running, walking and jumping surfaces particularly suited for use in racetracks, exercise areas, and equestrian performance or training rings for horses and ponies. The present innovation can also be used in jogging trails, paths and running areas for humans, dogs, vehicles, motorcycles and the like.

In one embodiment, the present innovation provides for engineered earthen surfaces that have widespread use in a number of different applications and are particularly suited for equestrian applications and provide a stable composition that has a number of other advantageous properties. For example, using a hydrophobic textile prevents rot while the superabsorbent polymer allows moisture attraction and release.

In one embodiment, the present innovation comprises a super absorbent polymer (SAP) coated non-woven fiber material combined with one or more materials selected from the group consisting of untreated non-woven fabric materials; polymeric materials, including fibers and particles; and fluff.

The present innovation comprises an engineered surface materials blend comprising a combination of materials selected from one or more of the following classes of ingredients: (i) SAP coated non-woven fabric materials; (ii) untreated non-woven fabric materials; (iii) polymeric materials, including staple fibers and particles; and (iv) fluff, a natural and/or synthetic cotton-like material that is generally a fibrous mass of natural and/or synthetic fibers, intertwined and entangled to form a cohesive unit of fibers and held together by interfacial friction and surface energy.

In one embodiment, the present innovation comprises an engineered surface materials blend comprising a combination of materials comprising at least 20% SAP coated non-woven fiber materials with the balance being made up of one or more materials selected from the group consisting of untreated non-woven fiber materials; polymeric materials, including fibers and particles; and fluff.

In another embodiment, the present innovation comprises a sand blend and an engineered surface materials blend comprising a SAP coated non-woven fiber materials mixed with a combination of materials selected from one or more of untreated non-woven fiber materials; polymeric materials, including fibers and particles; and fluff.

A composition suitable for forming a surface on which recreational activities including horses training and racing can be carried out, the composition including: i) non-woven fiber material and ii) a super absorbent polymer (SAP) composition comprising a combination of a soluble polymer and a cross linking agent that provides the super absorbent polymer composition with a suitable for absorbing water over a temperature range such that when mixed with the granular material a surface made from the composition can provide support for recreational activities.

According to one embodiment and as described in detail herein, the sand blend and engineered surface materials blend are intimately mixed. In one embodiment, the blends are mixed essentially in a dry state. According to one or more embodiments of the invention, the ingredients are essentially dry and may be mixed in any suitable manner consistent with the amount of surface material desired such as in tilling in situ or a cement mixer, or a cattle feed mixer or any other device that performs the intended function and yields the engineered earthen surface of the present innovation. According to one or more further embodiments of the invention, the ingredients are hydrated with water and mixed in any suitable manner consistent with the amount of surface material desired. According to one or more further embodiments of the invention, the ingredients are saturated with water and mixed in any suitable manner consistent with the amount of surface material desired. The specific ingredients are chosen such that the final composition is weather resistant and long lasting, and resistant to degradation when exposed to the conditions of normal outdoor use and alternatively and according to another embodiment, indoor use.

According to the present innovation there is also provided a particulate composition suitable for forming a surface on which equestrian activities including horses training and racing can be carried out, the composition including: (i) a granular or particulate material, preferably in the form of sand; and (ii) an engineered surface material blend described above which includes a super absorbent polymer (SAP) coated non-woven fiber materials mixed with a combination of materials selected from one or more of untreated non-woven fiber materials; polymeric materials, including fibers and particles; and fluff.

Although the granular material may be any form and be of any size, preferably the granular material is less than 8.0 mm in size. It is even more preferred that the material be in the size range of 0.05 to 5.0 mm. In one embodiment of the present innovation, the granular material comprises sand.

The sand may be any common type of sand and is preferably silica based sand. In general, there are two broad categories of sand available: manufactured sand which is produced as a product from rock crushing, and natural sand which is mined from wherever it has been deposited (e.g., river bed sand or bank sand).

Although any particle size of the sand may vary widely and, may for example, vary from 0.05 mm to 5 mm in diameter. In one embodiment of the present innovation, the sand varies from 0.075 to 5.0 mm.

In one embodiment of the present innovation, the particulate or granular material is sand having a size ranging from 0.02 to 2.5 mm. In another embodiment of the present innovation, the particulate or granular material is sand having a size ranging from 0.2 to 1.5 mm. In one or more embodiments of the present innovation, the mixture is laid out on a surface at a thickness in the range of 50 to 250 mm. In one or more embodiments of the present innovation, the mixture is laid out on a surface at a thickness in the range of 50 to 150 mm.

In one or more embodiments of the present innovation, an engineered earthen surface is provided in the form of a particulate composition for use as a sport or recreational surface comprising about 50-90 percent by weight of a sand blend and about 10-50% by weight of an engineered surface material blend.

The sand blend and engineered surface material blend are added and mixed together in a mixer or suitable device. All of the ingredients may be mixed as essentially dry solids or at least partially saturated with water. In one or more embodiments of the present innovation, any in situ method of mixing the ingredients, such as tilling, discing, slicing, plowing, etc., may be used.

The compositions of the present innovation can be advantageously laid down on the ground over a layer of material that will provide good drainage. While the surface can be laid over practically any type of surface, for example, cement, dirt, clay and turf, it is preferable for indoor application to lay it over cement or dirt to maximize the drainage benefits of the present innovation. In many indoor applications, the surface is laid over cement. In use, rain or irrigation water quickly penetrates and drains through the composition. This is an advantageous characteristic, and to be certain that the water will completely drain off the surface, an aggregate layer or other underlayment of, for example, crushed or broken gravel, stone, or other aggregate (e.g., quarry, granite or limestone fines or dust), or a mixture thereof, can be used for optimal drainage. To provide enhanced drainage functions, the underlayer should can have a depth of about 3-7 inches and be full of 1-5 inches of aggregate, such as crushed washed stone, which is ¼ to 2 inches in diameter. In addition, a pipe can be laid down with the crushed stone to facilitate rapid egress of any water. The size and uniformity of the drainage underlayer are not critical so long as drainage is accomplished and the particulate mixture of the present innovation does not significantly penetrate the drainage layer. Other grounds surface compositions are equally possible.

Engineered surfaces may be quantified by measuring the coefficient of restitution (COR). The coefficient of restitution is defined as the ratio of two velocities; the velocity of a ball after impact with the surface divided by the velocity of the ball prior to impact (ASTM, 2005a). In one or more embodiments, the coefficient of restitution measurements may range from about 65% to 45%. In one or more embodiments, the coefficient of restitution measurements may range from about 60% to 50%. In one or more embodiments, the coefficient of restitution measurements may range from about 58% to 51%, indicating that approximately 42-49% of the velocity of an approaching baseball is lost to the surface on the first bounce at 25 degree angle of inclination.

In one or more embodiments, the engineered surfaces of the present invention provide for permeability in the surface. In soil science, permeability is defined qualitatively as the ease with which gases, liquids, or plant roots penetrate or pass though a soil mass or layer.

In one or more embodiments, the engineered surfaces of the present invention provide for moisture wicking. Moisture wicking, as used herein, refers to the transportation of moisture with and against gravity. The moisture wicking may be measured by saturated hydraulic conductivity. Saturated hydraulic conductivity is a measure of the rate at which water will pass through sand. In one or more embodiments, the engineered surfaces of the present invention provide for conductivities of 4 to 30 inches per hour. In one or more embodiments, the engineered surfaces of the present invention provide for conductivities of 6 to 24 inches per hour. In one or more embodiments, the engineered surfaces of the present invention provide for conductivities of 8 to 20 inches per hour. In one or more embodiments, the engineered surfaces of the present invention provide for a hydrophobic and hydrophilic synergism with the materials when tilled into soil to provide for a proper balancing of moisture wicking and water retention.

The drainage underlayer can occupy the same linear dimensions in width and length as the engineered surface. However, it is contemplated that the underlayer can be longer, shorter, wider, or thinner than the engineered surface so long as the function of drainage is not significantly compromised. The composition is spread over the drainage underlayer to a suitable depth of at least 4 inches, and preferably at least 5 to 6 inches. The thickness can be increased beyond these limits, but considerations of increased cost versus diminution of enhanced benefits impose practical limits on thickness. The compositions of the present innovation can be used for long periods of time, for example, up to about 4 to 10 years, but eventually may require maintenance (e.g., refurbishing). Usually, the SAP, and not the particulate materials, degrades and the original particles can simply be recoated with SAP in a suitable mixing device. Or the SAP component can be sprayed in situ with a range a spray devices such as backpack sprayers to field sprayers.

In addition, a water-permeable separator layer, such as a suitable textile, net mesh, other porous membrane layer, or a mixture thereof can be interposed between the engineered surface and the drainage layer. The separator layer can be a synthetic. In one embodiment of the present innovation, a Geotextile membrane separates the particulate materials of the present innovation, especially the sand, from the drainage materials (e.g., crushed stone). Covering the crushed stone with a porous membrane prevents the intermixing of the surface layer with the drainage area. Without a separator layer, the sand content of the surface layer can ultimately leach into the crushed stone, thereby reducing drainage and modifying the composition of the surface layer, or at least that portion which is closest to the crushed stone. Suitable separator materials are chosen based on the particle size of the surface composition, its durability and its resistance to deterioration. Any material is satisfactory so long as it allows water to pass through it, while blocking the passage of any particulate matter.

In one or more embodiments, the compositions of the present innovation may be used for cooling and cushioning surfaces for animals including various livestock e.g., horses and dairy cows.

In one or more embodiments, the compositions of the present innovation advantageously comprise the following ingredients in the stated ranges by weight, based on the total weight of each composition, although volume measurements will also work. It will be appreciated that the below percentages are merely exemplary of certain embodiments and are not limiting of the scope of the present innovation since some variation can occur.

The term "fiber(s)" refer to generally as any fibers made with multi- or monofilament or fragments of material used to, inter alia, add mechanical strength and/or color(s) to the manufactured surface.

In one or more embodiments, the fibers are short length fibers, as distinct from continuous filaments, which are twisted together (spun) to form a coherent yarn. Most natural fibers are staple fibers, the main exception being silk which is a filament yarn. Most man-made staple fibers are produced in this form by slicing up a tow of continuous filament.

In one or more embodiments, the fibers are short fibers, typically ranging from ½ inch up to 18 inches long. Wool, cotton, and flax exist only as staple fibers. Manufactured staple fibers are cut to a specific length from the continuous filament fiber.

The term "staple fiber(s)" refer to generally as any fibers a natural fiber (raw cotton, wool, hemp, flax) or synthetic (polyethylene, polypropylene, nylon that can be twisted to form yarn; staple fibers vary widely in length. A variety of thin, monofilament or branched fibers are acceptable for use in an embodiment of the invention. For example, one may use polyethylene, polypropylene or nylon, provided that their temperature characteristics are compatible with the temperatures and conditions in the mixing environment. In one embodiment, aromatic polyamide fibers ("aramids") may be used. Plain aramid fibers are acceptable, but one may also use fibers that have been treated to alter their surface structure or chemical activity, or coated with a material in a process generally referred to as "sizing." Fiber treatments and coatings may alter the fibers' physical shape (e.g., making straight fibers curly or kinky), or may create sites at which certain chemical bonds are easier to form.

Example staple fibers include MONO-TUF™, a monofilament fiber manufactured from 100% virgin homopolymers polypropylene resins and MONO-PRO™, a high tensile strength, high modulus of elasticity, ultra-thin monofilament fiber from 100% virgin homopolymers polypropylene resins; NY-TUF 1™, a standard denier monofilament nylon fiber; NY-PRO™, a fine denier monofilament nylon fiber; FIBRIL-TUF™, a fibrillated fiber from 100% virgin homopolymers polypropylene resins and FIBRIL-PRO™, an ultra-low denier fibrillated fiber from 100% virgin homopolymers polypropylene resins. (ABC Polymer Industries).

In one or more embodiments, fibers have an aspect ratio of 10 to 150. In another embodiment, fibers have an aspect ratio of 20 to 120. In another embodiment, fibers have an aspect ratio of 30 to 100. In another embodiment, fibers have an aspect ratio of 50 to 80. The aspect ratio (l/d) is calculated by dividing fiber length (l) by its diameter (d).

In one or more embodiments, fibers for use in the engineered surfaces may be PROPEX polypropylene, polyethylene and nylon fibers (Propex Operating Company, Chattanooga, Tenn. 37416 USA) such as FIBERMESH® 150, 300 and 650 as well as FIBERCAST® 500 and ENDURO® 600.

With respect to the fibers, on the other hand, the initial volume of the fibers is not used, because the volume of the same quantity of fibers may vary in a ratio of more than 10 as a function of the processing of these fibers, which may be heavily compressed and occupy a small volume or on the other hand, be loosely packed and take up a huge volume. Therefore, measurement by the weight of fiber is the most practical parameter for finding out the quantity of fiber incorporated.

The polymeric material that can be used to form the composition of the present innovation can come in any number of different forms. For example, the polymeric material can be polymeric fibers. Polymeric fibers have wide spread use in a vast number of products and can include a wide range of different polymeric fibers that have different chemistry and different characteristics.

One class of polymeric fibers is polyester fibers. Polyester is a category of polymers, which contain the ester functional group in their main chain. Although there are many polyesters, the term "polyester" as a specific material most commonly refers to polyethylene terephthalate (PET). Polyesters include naturally-occurring chemicals, as well.

In accordance with the present invention, the polymeric material can include polyester as a component. The polyester can be provided in any number of different forms including but not limited to fibers and knit fabrics that are then processed to form small pieces thereof or a combination of both that can be mixed with the other components. In accordance with the present invention, the polymeric material that is added to the sand and nonwoven materials is in the form of pieces of a polyester knit fabric and/or polyester fibers. Suitable polyester knit fabric and polyester fibers can be obtained from any number of different commercial sources.

In one or more embodiments, the mixture comprises synthetic fibers that have a denier of less than 15, a length greater than 0.5 cm and less than 20 cm. In one or more embodiments, the fibers are made of a material selected from the group consisting of polyolefin, nylon, polypropylene, polyester and blends thereof. In one or more embodiments, the synthetic fiber elements are in the form of monofilaments, wherein each monofilament has a denier of less than 15, 14, 13, 12, 11, 10, 9, 8, 7, 6, 5, 4, 3, 2, or less, a length greater than 0.5, 0.75, 1, 1.25, 1.5, 2, 3 cm or more and a length less that 100, 75, 50, 30, 25, 20, 15, 10, 5 cm or less. In one or more embodiments, the fiber elements are polyolefin monofilaments having a denier between 1 and 10 and a length of about 0.5 cm to 10 cm. In one or more embodiments, the fiber elements are a monofilament having a denier between 1 and 7 and a length greater than 0.5 cm. Some deviation in the length may be tolerated.

In one or more embodiments of the invention, the fibers are between 0.1-10 inches long. In one or more embodiments of the invention, the fibers are between 0.1-5 inches long. In one or more embodiments of the invention, the fibers are between 0.1-3 inches long. In another embodiment of the invention, the fibers are between 0.5-2 inches long.

As for the fiber or fibrous material, general polyester staple fibers, sheath-core type polyester staple fibers or sheath-core type OEP (olefin polyethylene polypropylene—the inside is comprised of the polypropylene fiber having melting point of about 165 C. and the outside is comprised of the low-melting polyethylene fiber). In addition, a biodegradable fiber can be used as the fibrous material. The biodegradable fibers suitable for the present invention include corn starch fibers or sheath-core type corn starch fibers. Polyester fiber is the generic name of fibers prepared from polymeric compounds having ester groups in the molecule as the raw material. The polyester fiber has various merits including high strength, especially good knot strength and abrasion strength, no crumpling, rapid drying, no invasion with chemicals or bugs, etc. Other characteristic features include a high resistance to the heat. In general, synthetic fibers are weak to heat but, inter alia, polyesters are most resistant to heat with having the melting point of about 270 C.

In one or more embodiments of the invention, the average length of the fibers is greater that 2.5, 5, 10, 15 or 20 mm and less than 150, 125, 100, 75, 65, 60, 55, 50, 45, 40, 35 30 or 25 mm.

A fiber is generally considered a microfiber if it is one denier or less. A one-denier polyester fiber has a diameter of about ten micrometers. In tights and pantyhose, the linear density of yarn used in the manufacturing process determines the opacity of the article in the following categories of commerce: ultra sheer (below 10 denier), sheer (10 to 30 denier), semi-opaque (30 to 40 denier), opaque (40 to 70 denier) and thick opaque (70 denier or higher)

NON WOVENS: The non-woven source for the engineered surface innovation can be any polymer based fabric, including, but not limited to the following: polyethylene (PE), polypropylene (PP), polyester (PET), polyurethane, polyolefin, nylon, polyvinyl chloride (PVC), polystyrene (PS), Teflon, para aramid, polyamide. Alternatively, a fabric can be used formed of a natural non-woven cotton, etc. There are different ways of making non-woven known to those skilled in the art, e.g., Drylaid, Airlaid, Spunmelt, Spunlaid, Wetlaid. There are many production methods known to coat a non-woven with an aqueous formulation For example: Slot die coating, Fluidized Bed, General Dip and Bathe methods, 'The Meyer (Mayer) Rod Coating" method, Gravure/roll in pan method.

Nonwoven fabric is a fabric-like material made from long fibers, bonded together by chemical, mechanical, heat or solvent treatment. The term is used in the textile manufacturing industry to denote fabrics, such as felt, which are neither woven nor knitted.

Nonwoven fabrics are broadly defined as sheet or web structures bonded together by entangling fiber or filaments (and by perforating films) mechanically, thermally or chemically. They are flat or tufted porous sheets that are made directly from separate fibers, molten plastic or plastic film. They are not made by weaving or knitting and do not require converting the fibers to yarn. Typically, a certain percentage of recycled fabrics and oil-based materials are used in nonwoven fabrics. The percentages of recycled fabrics vary based upon the strength of material needed for the specific use. In addition, some nonwoven fabrics can be recycled after use, given the proper treatment and facilities. For this reason, some consider nonwovens a more ecological fabric for certain applications, especially in fields.

Nonwovens are typically manufactured by putting small fibers together in the form of a sheet or web (similar to paper on a paper machine), and then binding them either mechanically (as in the case of felt, by interlocking them with serrated needles such that the inter-fiber friction results in a stronger more cohesive fabric), with an adhesive, or thermally (by applying binder (in the form of powder, paste, or polymer melt) and melting the binder onto the web by increasing temperature).

In one or more embodiments of the present invention, the fiber blend material comprises 0.25 to 0.75 in (0.64 to 1.91 cm) long fibers, but sometimes longer if the fiber is stiff or thick. In one or more additional embodiment of the present invention, the fiber blend material comprises 0.5 to 4.0 in (1.3 to 10.2 cm) fibers. In one or more additional embodiment of the present invention, the fiber blend material comprises ~1.5" long fibers. Nonwoven fabrics can be manufactured from acrylic, acetate, nylon, rayon, polyethylene terephthalate (PET), polypropylene, polyolefin, polyester, rayon, fiberglass and synthetic and nonsynthetic fiber blends.

Nonwoven fabrics made from polyester thread or yarn are used extensively in apparel and home furnishings, from shirts and pants to jackets and hats, bed sheets, blankets and upholstered furniture. Polyester fiber is used as cushioning and insulating material in pillows, comforters and upholstery padding. Thus, one form of polyester is as a nonwoven fabric. In industry, polyester is a synthetic polymer made of purified terephthalic acid (PTA) or its dimethyl ester dimethyl terephthalate (DMT) and monoethylene glycol (MEG).

In accordance with the present innovation, the material can include polyester as a component. The polyester can be provided in any number of different forms including but not limited to fibers and nonwoven fabrics that are then processed to form small pieces thereof or a combination of both that can be mixed with the other components. In accordance with the present innovation, the SAP material that is added to the sand and engineered surface material is in the form of coated pieces of a polyester nonwoven fabric and/or polyester fibers. Suitable polyester nonwoven fabric and polyester fibers can be obtained from any number of different commercial sources.

For example and according to one embodiment, the polyester that is used in the form of a polyester geotextile material. In geo textile form, the material is in the form of small pieces of textile material. Polyester staple fibers (PSF) are generally polyester fibers measuring 1 denier or more in diameter, cut to lengths varying from 5 mm to 150 mm. In another embodiment the PSF are polyester fibers measuring 2 denier or more in diameter, cut to lengths varying from one inch (25 mm) to five inches (127 mm). The staple fibers are typically between 1-5 inches long and work like a root system through the sand.

The term "superabsorbent materials" refers to water-swellable, water-insoluble organic or inorganic materials including superabsorbent polymers and superabsorbent polymer compositions capable, under the most favorable conditions, of absorbing at least about 1 times their weight, or at least about five (5) times their weight, or at least about ten (10) times their weight in an aqueous solution. Superabsorbent materials include a "superabsorbent polymer," "SAP", or "hydrogel(s)" and are normally water-soluble polymer which has been cross-linked to render it substantially water insoluble, but capable of absorbing water. Numerous examples of superabsorbers and their methods of preparation may be found for example in U.S. Pat. Nos. 4,102,340; 4,467,012; 4,950,264; 5,147,343; 5,328,935; 5,338,766; 5,372,766; 5,849,816; 5,859,077; and U.S. Pat. Re. 32,649, the disclosures of which are hereby incorporated by reference in their entirety. It is believed that any hydrogel can be effective in the present invention, in view of the application in the environment, it is desirable that the hydrogel be one that is not an environmental pollutant. While the hydrogel may be a natural or a synthetic hydrogel, synthetic hydrogels have can be particularly advantageous in terms of water absorptivity and shelf life. Synthetic hydrogels are usually cross-linked polyacrylamides or cross-linked polyacrylates and have been reported to remain active for up to two years or more. Other examples of suitable hydrogels include those of carrageenan, agar and alginic acid, and gellan gum. Further examples of hydrogels may be noted in U.S. Pat. No. 4,779,376 to Redenbaugh, incorporated herein by reference, and in commonly available references on hydrogels. In one or more embodiments, the superabsorbent polymer is introduced into the final surface material preferable in quantities of from 1 kg to 10 kg/m3 of soil. The ranges for the quantities of superabsorbent polymer include all specific values and sub-ranges therebetween, such as 1.5, 2, 2.5, 3, 3.5, 4, 4.5, 5, 5.5, 6, 6.5, 7, 7.5, 8, 8.5, 9, and 9.5 kg/m3 of soil.

SAPs generally fall into three classes, namely starch graft copolymers, cross-linked carboxymethylcellulose derivatives and modified hydrophilic polyacrylates or polyacrylamides. Non-limiting examples of such absorbent polymers are hydrolyzed starch-acrylate graft co-polymer, saponified acrylic acid ester-vinyl co-polymer, neutralized cross-linked polyacrylic acid, cross-linked polyacrylate salt, and carboxylated cellulose. The preferred SAPs, upon absorbing fluids, form hydrogels. SAPs are well known and are commercially available from several sources.

The term "surface cross-linking" means that the level of functional cross-links in the vicinity of the surface of the superabsorbent polymer particle generally is higher than the level of functional cross-links in the interior of the superabsorbent polymer particle. As used herein, "surface" describes the outer-facing boundaries of the particle. For porous superabsorbent polymer particles, exposed internal surfaces also are included in the definition of surface.

"Water-absorbing material" as used herein includes, but is not limited to a hydrophilic polymer. "Water-absorbing material" as used herein includes, but is not limited to a highly absorbent material, which may comprises a superabsorbent polymer. Examples of water-vapor trapping materials include, but are not limited to, acrylate polymers, generally formed from acrylic acid, methacrylic acid, acrylate, methyl acrylate, ethyl acrylate, methyl methacrylate, ethyl methacrylate, a dialkylaminoalkyl acrylate, a dialkylaminoalkyl methacrylate, a trialkylammonioalkyl acrylate, and/or a trialkylammonioalkyl methacrylate, and include the polymers or copolymers of acrylic acid, methacrylic acid, methyl methacrylate, ethyl methacrylate, 2-dimethylaminoethyl methacrylate, and trimethylammonioethyl methacrylate chloride. Examples of hydrophilic polymers include, but is not limited to poly(N-vinyl lactams), poly(N-vinyl acrylamides), poly(N-alkylacrylamides), substituted and unsubstituted acrylic and methacrylic acid polymers, polyvinyl alcohol (PVA), polyvinylamine, copolymers thereof and copolymers with other types of hydrophilic monomers (e.g. vinyl acetate), polysaccharides, cross-linked acrylate polymers and copolymers, carbomers, cross-linked acrylamide-sodium acrylate copolymers, gelatin, vegetable polysaccharides, such as alginates, pectins, carrageenans, or xanthan, starch and starch derivatives, galactomannan and galactomannan derivatives. polyvinyl pyrrolidone (PVP), poly(N-vinyl caprolactam) (PVCap), poly(N-vinyl acetamides), polyacrylic acid, polymethacrylic acid, and copolymers and blends thereof. PVP and PVCap. Examples of superabsorbent polymers include hydrogels. Copolymers of any of the water-vapor trapping materials mentioned herein, and blends thereof may also be used.

The term "% by weight" or "% wt." when used herein and referring to components of the superabsorbent polymer composition, is to be interpreted as based on the weight of the dry superabsorbent polymer composition, unless otherwise specified herein.

The term "cross-linking" or "cross-linked" used in reference to the superabsorbent polymer refers to any means for effectively rendering normally water-soluble materials substantially water-insoluble but swellable. Such a cross-linking means can include for example, physical entanglement, crystalline domains, covalent bonds, ionic complexes and associations, hydrophilic associations such as hydrogen bonding, hydrophobic associations or Van der Waals forces. Superabsorbent polymers include internal cross-linking and surface cross-linking.

"Performance-enhancing active" or "Performance-enhancing additive" as used herein, refers to any additive which is desirable to add to the infill particles including an antimicrobial, an odor reducing material, a binder, a fragrance, a color altering agent, a dust reducing agent, a nonstick release agent, a superabsorbent material, cyclodextrin, zeolite, activated carbon, a pH altering agent, a salt forming material, a ricinoleate, silica gel, UV stabilizers or protectants, crystalline silica, activated alumina, an anti-clumping agent, and mixtures thereof. Performance-enhancing actives that inhibit the formation of odor include a water-soluble metal salt such as silver, copper, zinc, iron, and aluminum salts and mixtures thereof.

In one embodiment, the performance-enhancing additive is sprayed onto the particles. In another embodiment, the performance-enhancing additives are dry-blended with the particles. In another embodiment the performance enhancing additive is blended with an elastomeric material than ground into particles.

The super absorbent polymers and/or the cooling water absorbing textile may further be treated with one or more antimicrobial agents, one or more anti-freezing agents, or a combination thereof.

In one embodiment, performance-enhancing additive(s) are added to the material. In one embodiment, the performance-enhancing additive(s) are antimicrobials. In one embodiment, the antimicrobial actives are boron containing compounds such as borax pentahydrate, borax decahydrate, boric acid, polyborate, tetraboric acid, sodium metaborate, anhydrous, boron components of polymers, and mixtures thereof.

In one embodiment, the odor absorbing/inhibiting active inhibits the formation of odors. An illustrative material is a water-soluble metal salt such as silver, copper, zinc, iron, and aluminum salts and mixtures thereof. In another embodiment, the metallic salts are zinc chloride, zinc gluconate, zinc lactate, zinc maleate, zinc salicylate, zinc sulfate, zinc ricinoleate, copper chloride, copper gluconate, and mixtures thereof. In another embodiment, the odor control actives include nanoparticles that may be composed of many different materials such as carbon, metals, metal halides or oxides, or other materials. Additional types of odor absorbing/inhibiting actives include cyclodextrin, zeolites, silicas, activated carbon (also known as activated charcoal), acidic, salt-forming materials, and mixtures thereof. Activated alumina ($Al_2O_3$) has been found to provide odor control comparable and even superior to other odor control additives such as activated carbon, zeolites, and silica gel. Alumina is a white granular material, and is also called aluminum oxide. Chitin or chitosan can also be added as an antimicrobial agent.

In some aspects, additional additives may optionally be employed with the particulate superabsorbent polymer compositions, including odor-binding substances, such as cyclodextrins, zeolites, inorganic or organic salts, and similar materials; anti-caking additives, flow modification agents, surfactants, viscosity modifiers, and the like. In addition, additives may be employed that perform several roles during modifications. For example, a single additive may be a surfactant, viscosity modifier, and may react to cross-link polymer chains.

In another embodiment, a color altering agent such as a dye, pigmented polymer, metallic paint, bleach, lightener, etc. may be added to vary the color of absorbent particles, such as to darken or lighten the color of all or parts of the composition so it is more appealing. In another embodiment, the color-altering agent comprises up to approximately 20% of the absorbent composition, more preferably, 0.001%-5% of the composition. In another embodiment, the color altering agent comprises approximately 0.001%-0.1% of the composition.

In another embodiment, the carriers for the color-altering agent are zeolites, carbon, charcoal, etc. These substrates can be dyed, painted, coated with powdered colorant, etc.

In another embodiment, the activated alumina and activated carbon may include an embedded coloring agent that has been added during the fabrication of the activated alumina or activated carbon to form a colored particle. In composite and other particles, the activated alumina can also be added in an amount sufficient to lighten or otherwise alter the overall color of the particle or the overall color of the entire composition. Large particles of carbon, e.g., activated carbon or charcoal, can also be used as a darkening agent. Such particles are preferably within a particle diameter size range of about 0.01 to 10 times the mean diameter of the other particles in the mixture. In another embodiment, the core mentioned above can also be considered an active, for example including a lightweight material in the core to reduce the weight of the particle, a core made of pH-altering material, etc.

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

"Polymer" as used herein, refers to a series of repeating monomeric units that have been cross-linked or polymerized. Any suitable polymer can be used to carry out the present innovation. It is possible that the polymers of the present innovation may also comprise two, three, four or more different polymers. In some embodiments, of the present innovation only one polymer is used. In some preferred embodiments a combination of two or more polymers is used. Combinations of polymers can be in varying ratios, to provide coatings with differing properties. Those of skill in the art of polymer chemistry will be familiar with the different properties of polymeric compounds. Examples of polymers that may be used in the present innovation include, but are not limited to polycarboxylic acids, cellulosic polymers, proteins, polypeptides, polyvinylpyrrolidone, maleic anhydride polymers, polyamides, polyvinyl alcohols, polyethylene oxides, glycosaminoglycans, polysaccharides, polyesters, polyurethanes, polystyrenes, copolymers, silicones, polyorthoesters, polyanhydrides, copolymers of vinyl monomers, polycarbonates, polyethylenes, polypropylenes, polylactic acids, polyglycolic acids, polycaprolactones, polyhydroxybutyrate valerates, polyacrylamides, polyethers, polyurethane dispersions, polyacrylates, acrylic latex dispersions, polyacrylic acid, mixtures and copolymers thereof. The polymers of the present innovation may be natural or synthetic in origin, including gelatin, chitosan, dextrin, cyclodextrin, poly(urethanes), Poly(siloxanes) or silicones, Poly(acrylates) such as poly(methyl methacrylate), poly(butyl methacrylate), and Poly(2-hydroxy ethyl methacrylate), Poly(vinyl alcohol) Poly(olefins) such as poly(ethylene), poly(isoprene), halogenated polymers such as Poly(tetrafluoroethylene)—and derivatives and copolymers such as those commonly sold as Teflon products, Poly(vinylidine fluoride), Poly(vinyl acetate), Poly(vinyl pyrrolidone), Poly(acrylic acid), Polyacrylamide, Poly(ethylene-co-vinyl acetate), Poly(ethylene glycol), Poly(propylene glycol), Poly(methacrylic acid); etc.

"Binder," "binding agent" or "coupling agent" refers to a material having binding, adhesive or attachment properties with or without chemical, thermal, pressure or other treatment. The term "binder" includes materials that are capable of attaching themselves to a substrate or are capable of attaching other substances to a substrate. The binder component used in the coating compositions of the present disclosure can include any polymeric material customarily used as a binder in coating compositions.

In one embodiment, the binder is a composition such as water, polyacrylate, lignin sulfonate (solid), polymeric binders, silicone polymer, e.g., polyorganosiloxane, and combinations thereof. In another embodiment, the organic polymerizable binders include, but are not limited to, carboxymethylcellulose (CMC) and its derivatives and its metal salts, guar gum, agar, cellulose, xanthan gum, starch, lignin, polyvinyl alcohol, polyacrylic acid, styrene butadiene resins (SBR), and polystyrene acrylic acid resins.

In one embodiment, the binders are selected from the group consisting of acrylic acid grafted starch, alginates, alkoxysilanes, for example, tetraethoxy silane (TEOS), block copolymers, carboxy methyl cellulose, carboxymethyl starch, carboxymethylcellulose, carrageenan gum, casein, cellulose acetate phthalate, cellulose based polymers, cellulose derivatives such as dextrans and starches, gelatin, guar gum cellulose, hydrolyzed acrylonitrile grafted starch, hydroxymethyl cellulose, lignin, locust bean gum, maleic anhydride copolymers, methyl cellulose, monomeric silanes, natural gums, pectins, poly (2-hydroxyethylacrylate), poly (ethylene oxide), poly (sodium acrylate-co-acrylic acid), poly(2-hydroxyethyl-methacrylate), poly (acrylamides), poly(acrylates), poly(ethers), poly (methacrylic acid), poly(N-vinyl pyrrolidone), poly(vinyl alcohol), poly(vinyl sulfonates), poly(vinylsulfonic acid), polyesters, polyethylene oxide, polymeric binders, polymers formed from acid-group containing monomers, polyorganosiloxane, polystyrene acrylic acid resins, polyurethanes, polyvinylalcohol, polyvinylmethyl ether, polyvinylpyrrolidone, silicates, silicone polymer, starch, starch-based polymers, silanes, organosiloxanes, styrene butadiene resins, xanthan gum and mixtures thereof.

The term "coupling agent" refers to a binder that is used as an adhesion promoter enhancing adhesion between a surface of an inorganic material, such as silica, and an organic material through chemical coupling there between during formulation of the composition.

Additional additives include anti-oxidants, fillers such as inorganic fillers, UV stabilizers, UV absorbers or combinations of these additives.

Examples of suitable anti-oxidants include those based upon either a hindered phenol or a sulfur-containing organometallic salt. Among the hindered phenols are the ortho-substituted or the 2,5-di-substituted phenols where the substituent group (or groups) is a branched hydrocarbon radical having 2 to 30 carbon atoms, e.g., tertiary butyl or tertiary amyl. Other useful hindered phenols include para-substituted phenols where the substituent groups is an alkoxy group in which the alkyl group of the alkoxy is a methyl, ethyl, 3-substituted propionic ester, etc. group. Among the sulfur-containing organometallic salts are the nickel derivatives of dibutyl dithiocarbamate. Representative examples of commercially available anti-oxidants include the hindered phenols available under the trade designations "IRGANOX 1076", available from Ciba, and "CYANOX LTDP", available from American Cyanamid Co.

Examples of suitable UV stabilizers include Ultraviolet absorbers (UVAs) and Hindered Amine Light Stabilizers (HALS). Benzotriazole UVAs such as the compounds TINUVIN P, 213, 234, 326, 327, 328, and 571 available from Ciba, Tarrytown, N.Y.; hydroxylphenyl triazines such as TINUVIN 400 and 405 available from Ciba, Tarrytown, N.Y.; HALS such as TINUVIN 123, 144, 622, 765, 770 available from Ciba, Tarrytown, N.Y.; and the antioxidants IRGANOX 1010, 1135 and 1076 available from Ciba, Tarrytown, N.Y., are particularly useful. The material TINUVIN B75, a product containing UVA, HALS and antioxidant available from Ciba, Tarrytown, N.Y. is also suitable.

Substrate" as used herein, refers to any surface upon which it is desirable to deposit a the SAP fabric blend. In the present innovation, the substrate is generally made up of fine granules of stone, gravel, sand, asphalt, cement, ceramic beads, soil, clay, diatomaceous earth, perlite, silica, organic minerals, rubber or combinations thereof.

The aqueous super absorbent polymer compositions of the present innovation comprise a soluble polymer, a crosslinking agent and water.

The aqueous super absorbent polymer composition can be sprayed, foam coated, printed or saturated onto a surface or into a substrate. Depending on the amount of the super absorbent polymer applied, the coated surface is characterized by enhanced hydrophilicity and/or enhanced absorbency. To provide enhanced absorbency properties to the substrate or fibers, the amount of aqueous super absorbent polymer employed typically ranges from about 50 to about 200 weight percent and preferably from about 75 to about 150 weight percent of the total weight of the substrate or fibers coated.

Further, applying a sufficient amount of the aqueous super absorbent polymer composition to a web of fibers may form a self-supporting super absorbent web. The starting fiber layer or mass can be formed by any one of the conventional techniques for depositing or arranging fibers in a web or layer. Examples of these techniques include carding, garneting, air-laying and wet laying, which are well known to those skilled in the art. Individual webs or thin layers formed by one or more of these techniques can also be laminated to provide more loft and caliper. Typically, the fibers extend in a plurality of diverse directions in general alignment with the major plane of the fabric, overlapping, intersecting and supporting one another to form an open, porous structure.

The nonwoven web can be bonded with polymeric binders well known in the art, such as vinyl acetate/ethylene/N-methylolacrylamide copolymers, self-crosslinking acrylics and styrene-butadienes. The liquid absorbent composition may have sufficient adhesive qualities (wet and dry strength) alone for use as both the nonwoven binder and the absorbent material.

Thus, various polymeric binders known in the art can be used to prepare nonwoven products or fabrics by a variety of methods known in the art which, in general, involve the impregnation of a loosely assembled mass of fibers with the aqueous emulsion nonwoven binder, followed by moderate heating to coalesce the mass. This moderate heating also serves to cure the binder by forming a cross-linked interpolymer. Before being applied, the binder is mixed with a suitable catalyst to activate the crosslinking functional moieties on the polymer backbone. For example, an acid catalyst such as mineral acids (e.g., hydrogen chloride) or organic acids (e.g., oxalic acid) or acid salts such as ammonium chloride, can be used. The amount of catalyst is generally from 0.10% to 2% of the total polymer.

When used also as the polymeric binder, the super absorbent polymer composition is applied to the fibrous starting web in an amount sufficient to form a self-supporting web and provide enhanced absorbent properties. The concentration of super absorbent polymer suitably ranges from about 3 to about 100 weight percent preferably from about 10 to about 50 weight percent based on the starting web. The impregnated web is then dried and cured. Passing through one or more air dryers and then through a curing oven suitably dries the nonwoven products. Typical conditions of time and temperature are well known in the art. Where a separate polymeric binder is used to bond the nonwoven web, the absorbent polymer is applied to the bonded web in an amount sufficient to provide enhanced absorbent properties to the web and may range from about 5 to about 50 weight percent, preferably from about 10 to about 25 weight percent, based on the web.

Super absorbent polymers are known in the art and described in Anderson et al. U.S. Pat. Nos. 6,686,414; 6,984,419; and 7,438,951; and in Chang et al. U.S. Pat. No. 4,914,170, the disclosure of which are hereby incorporated by reference in their entirety. A super absorbent polymer (also referred to as a SAP) absorbs large quantities of water as well as other fluids. A super absorbent polymer is typically designed to have variable resistance to humidity, but will swell when put in intimate contact with water.

A super absorbent polymer is usually prepared by one of two methods. The first method involves sufficiently cross-linking emulsion or aqueous solution polymers to make the polymers water insoluble, while retaining their ability to swell in water. The second method is directed at effectively modifying water-insoluble polymers with hydrophilic groups to induce swelling when the polymers are in contact with water.

Super absorbent polymers find application in the medical, food and agricultural industries. These polymers also find utility in many consumer products, in particular disposable absorbent articles such as disposable diapers, incontinent pads and feminine care products. The ability to provide thinner, more compact absorbent articles has been contingent on the ability to develop relatively thin absorbent cores that can acquire, distribute and store large quantities of fluid, particularly urine. As a result, super absorbent polymers are being developed with a higher capacity to absorb large quantities of fluids, especially water.

Super absorbent polymers are available in a particulate, fibrous, granular or powder form. In the case of diaper construction, super absorbent polymers are sifted into the absorbent core. The absorbent core is sandwiched between a fluid pervious top sheet and a fluid impervious back sheet. The incorporation of particulate super absorbent polymers tends to generate dust from the super absorbent polymer fines. Further, conventional absorbent articles have the limitation of the super absorbent polymer not being sufficiently immobilized and thus free to migrate and shift during the manufacturing process, shipping/handling and/or use. Movement of the super absorbent polymer particles during manufacture can lead to handling losses as well as improper distribution of the particles.

Further, absorbency problems occur when the super absorbent polymer particles migrate prior to, during or after swelling. This inability to fix the particles at optimum locations leads to insufficient fluid storage in one area and over capacity in other areas. Another important factor is the liquid permeability of the super absorbent polymer. The fluid transport properties of the gel layer formed as a result of the swelling super absorbent polymer particles in the presence of fluids are extremely important. Although the formation of a super absorbent polymer gel layer fluid barrier (known as "gel blocking") is desirable for some applications, such as for use in cables, the formation of a gel layer in disposable absorbent products is undesirable since the gel layer greatly reduces the efficiency of the super absorbent polymer. Thus, the advantages of being able to fixate super absorbent polymer particles in place are apparent and several ways of accomplishing that have been suggested.

There are patents that disclose crosslinkable, water soluble/swellable polyacrylate based compositions. However, while commercially available super absorbent polymers tend to be in granular, fibrous, particulate or powdered form, the focus of the prior art is making highly viscous emulsions and dispersions that are subsequently dried, masticated, pulverized or ground to the desired size.

As industry recognized the deficiencies of a particulate super absorbent polymer, aqueous based super absorbent polymer compositions began to be developed. Cheng et al. U.S. Pat. No. 5,693,707, the disclosure of which is hereby incorporated by reference in its entirety, teaches an aqueous polymer composition comprising 10 to 40% of a polymer in water, the polymer consisting essentially of 20-90 weight percent of an alpha, beta-ethylenically unsaturated carboxylic acid monomer, at least one softening monomer, the aqueous composition being adjusted to pH 4-6 with an alkali metal hydroxide or an alkaline earth metal hydroxide.

Depending on the desired final composition, additional components can be used in these compositions, examples of which are dispersants, pH modifiers, binders, surfactants, stabilizers and nutrients. For example, these components can be used in amounts of from 1-20 percent by weight, (based on the weight of the super absorbent polymer(s) in the final composition), preferably from 5-15 percent by weight or more preferably from 5-10 percent by weight, based on the weight of the super absorbent polymer(s) in the final composition.

Polymerization of the one or more super absorbent polymers may occur via exposure to ultraviolet (UV) light radiation, peroxides, or other known polymerization process. UV-dependent photo-initiators of polymerization useful in exemplary embodiments of the present innovation are water-soluble or water dispersible compounds that generate free radicals upon exposure to UV radiation. Examples of such polymerization initiators include, 4-benzoyl-N,N-dimethyl-N-(2-(1-oxo-2-propenyloxy)ethyl) benzenemethanananaminium bromide in combination with N-methyl-diethanolamine, and 2-hydroxy-2-methyl-1-phenyl-1-propanone.

When the super absorbent polymers are contacted with water, the super absorbent polymers increase dramatically in size. Depending on the relative size and thickness, the super absorbent polymers may reach maximum moisture retention in as quickly as about ten minutes or as much as days. After reaching maximum moisture retention, the retained moisture slowly releases from the super absorbent polymers depending on the particular conditions present, such as for example, ambient temperature, sunlight, humidity, etc.

The present innovation also contemplates the use of small amounts of water insoluble monomers, provided the intended properties of the pre-cross-linked and/or post-cross-linked polymer are not adversely affected.

Any free radical generating source, such as peroxides and persulfates, may be used to initiate the polymerization of the monomers as well known to those skilled in the art. Further, chain transfer agents known in the art may be employed to alter the molecular weight of the super absorbent polymer.

The aqueous composition of the carboxylic acid-containing polymer contains about 5 to about 65 weight percent solids, preferably about 10 to about 50 weight percent solids, and more preferably about 20 to about 40 weight percent solids. When polymerization is essentially complete, the aqueous composition is adjusted to a pH of about 7-10 using an alkali metal hydroxide (such as sodium hydroxide or potassium hydroxide), and/or an alkaline earth metal hydroxide, such as calcium hydroxide. Further, a metal alkoxide can be used.

In the composition of the present disclosure, the amount of super absorbent polymer can vary, but is generally in the ratio of polymer:water of up to 1:1.

To effect crosslinking of the polymer through its carboxylic acid functionality and create a super absorbent polymer, a sufficient amount of crosslinking agent is added to the aqueous polymer composition. Suitable crosslinking agents include any substance that will react with the hydrophilic groups of the aqueous solution polymer. The selection and concentration of crosslinking agent will affect the absorbent rate and capacity. Preferably, the crosslinking agent reacts with the functional groups on the polymer in less than 24 hours and at ambient and/or elevated temperatures.

Any of the known crosslinking agents may be employed, such as those described in Ganslow et al. U.S. Pat. No. 4,090,013, the disclosure of which is hereby incorporated by reference in its entirety. The use of zirconium ions, ferric aluminum, chromic ions, titanium ions, zinc ions, aluminum ions and aziridine has been found to be useful as crosslinking agents when used separately or in combination with any one or more of these agents.

The crosslinking agent is added to the aqueous polymer solution at a concentration ranging from about 1 part to about 20 parts, preferably from about 2 parts to 10 parts. Once dried, this amount corresponds to a weight ratio of about 10 parts polymer to about 1 part crosslinking agent, based on polymer solids.

The extent of crosslinking is critical to the absorbent properties of the compositions of the present disclosure. At increased crosslinking agent concentrations, the polymer crosslinks to a greater extent increasing the total fluid holding capacity under load. Conversely, at low crosslinking agent concentrations, the total absorbent capacity under load is reduced. Further, the viscosity is critical to the ease of application. The cross-linked polymer absorbs about 50 to 150, and preferably about 100 times, its weight of the polymer in water. Under conditions of very low humidity, the cross-linked polymer may become sufficiently dehydrated such that the dried polymer film is friable. However, at atmospheric conditions, wherein the relative humidity ranges from 20% to 85%, the dried polymer is typically translucent and flexible due to its hydroscopic nature and propensity to be in equilibrium with the moisture content of its environment. In preferred embodiments, the cross-linked polymer absorbs at least about 5 weight percent, preferably at least about 10 weight percent and more preferably at least about 20 weight percent of moisture from the air at ambient temperature and about 50% relative humidity.

Curing is effective to obtain cross-linking of the soluble polymer. Before, after or during curing, a super absorbent polymer in particulate form may be blended with the soluble polymer and cross-linking agent.

The super absorbent polymers of this innovation are preferably cured at a temperature within the range of 40° F. to about 350° F. In another embodiment, the super absorbent polymer coating is cured at a temperature from about 50° F. to about 150° F. In another embodiment, the super absorbent polymer coating is cured at a temperature from about 50° F. to about 100° F. In another embodiment, the super absorbent polymer coating is cured at a temperature from about 100° F. to about 300° F. In another embodiment, the super absorbent polymer coating is cured at a temperature from about 150° F. to about 300° F. In another embodiment, the super absorbent polymer coating is cured at a temperature from about 170° F. to about 300° F. In another embodiment, the super absorbent polymer coating is cured at a temperature from about 200° F. to about 275° F.

In one or more embodiments, the super absorbent polymer compositions of typically possess sufficient wet adhesion to adhere to the intended substrate. However, in embodiments wherein it is desirable to increase the adhesive and/or cohesive strength of the super absorbent polymer composition, the composition of in one or more embodiments can be advantageously combined with compatible water based adhesives in either emulsion or dispersion form. Suitable water based adhesives include acrylics, vinyl acrylics, styrene acrylics, styrene butadiene rubber, vinyl acetate-versatic acid esters and vinyl acetate-ethylene. For such embodiments, the super absorbent composition may be combined with the water based adhesive emulsion/dispersion at ratios ranging from 95:5 to 5:95, preferably from about 20:1 to 5:1, and most preferably from about 1:1 to about 2:1.

SAP Coating and Curing Process: In one embodiment, the present innovation provides for a water based super absorbent polymer blend, which is a combination of a soluble polymer and a cross linking agent, applied to a substrate to form a super absorbent polymer coating upon drying. The polymer and cross linker can be pre-blended prior to application or applied in any sequence.

In one embodiment, the cross linking action is activated when the water is released from the SAP system initially and the composition dries. This drives the cross-linking process and curing of the soluble polymer into a super absorbent polymer.

In one embodiment, the super absorbent polymer coating is cured at a temperature from about 40° F. to about 350° F. In another embodiment, the super absorbent polymer coating is cured at a temperature from about 150° F. to about 300° F. In another embodiment, the super absorbent polymer coating is cured at a temperature from about 200° F. to about 300° F. In another embodiment, the super absorbent polymer coating is cured at a temperature from about 225° F. to about 275° F.

In one embodiment, the characteristics of the super absorption polymer composition, such as hydration capacity, moisture pickup time, and gel strength, can be finely adjusted and calibrated by the precise percentages of ingredients included in the formulation.

In one embodiment, the dilution percentages with water are from about 1% H2O:99% SAP to about 50% H2O:50% SAP. In another embodiment, the dilution percentages with water are from about 10% H2O:90% SAP to about 30% H2O:70% SAP. In another embodiment, the dilution percentages with water are from about 20% H2O:80% SAP to about 30% H2O:70% SAP. In another embodiment, the dilution percentages with water are from about 22% H2O:78% SAP to about 28% H2O:72% SAP.

In one embodiment, the fabric substrates are chosen based on desired functionality of finished geotextile.

Convertible Surfaces

In one embodiment, the materials of the present invention are used to create a convertible surface using the fiber blend material 102. In one embodiment, for every square foot of the surface/subsurface to be covered, the amount of sand and fiber blend material 102 is from about 25-100 lbs. of sand combined with 0.1-10 pounds of fiber blend material 102. In another embodiment, for every square foot of the surface/subsurface, the amount of sand and fiber blend material 102 is from about 40-80 lbs. of sand combined with 0.2-8 pounds of fiber blend material 102. In another embodiment, for every square foot of surface/subsurface, the amount of sand and fiber blend material 102 is from about 45-60 lbs. of sand combined with 0.25-4 pounds of fiber blend material 102. In another embodiment, for every square foot of the arena, the amount of sand and fiber blend material 102 is from about 45-60 pounds of sand combined with 0.25-2 pounds of fiber blend material 102. In one or more embodiments, the fiber blend material 102 does not contain SAP.

In one exemplary embodiment, an engineered surface according to the present invention is created by combining from 1-10 pounds of sub-angular sand plus 0.1-0.7 pounds of SAP fiber blend per square foot of soil surface. In another exemplary embodiment, an engineered surface according to the present invention is created by combining from 2-8 pounds of sub-angular sand plus 0.1-0.5 pounds of SAP fiber blend per square foot of soil surface. In anpother exemplary embodiment, an engineered surface according to the present invention is created by combining from 3-7 pounds of sub-angular sand plus 0.1-0.3 pounds of SAP fiber blend per square foot of soil surface. In order to prepare the surface in one exemplary embodiment, the steps are: (a) shave down the existing soil surface in order to level and remove existing vegetation; (b) apply a thin layer of sand to the shaved soil layer according to the above-referenced amounts; (c) apply 0.1-0.25 pounds of SAP fiber blend per square foot of soil surface; (d) apply 3-6 pounds of subangular sand per square foot of soil surface; and (e) after the sand and fiber are evenly distributed, rake or roll the material until desired base consistency is achieved. Optionally, step (f) tamp or compact the surface after raking and/or rolling (for example, using a plate compactor) to smooth and compact the surface to achieve a desired level of compaction. In conditions where weed seeds lay dormant in the soil substrate, a pre emergent herbicide could be applied over the finished base. As an alternative, a very light geotextile could be installed over the sand base. Generally, it is not necessary to add moisture at time of installation. The friction of the dry fibers allows for gripping the shallow sand substrate and blends readily. However, a watering of the sand before the final rolling may be used to add cohesion. In one or more embodiments, the fiber blend material does not contain SAP. In one or more embodiments, the fiber blend material does not contain SAP but a SAP product is added after installation such as by spraying a liquid SAP on the finished surface.

In one embodiment, the materials of the present invention are used to create a convertible surface using the fiber blend material 102. In one embodiment, for every square foot of the surface/subsurface to be covered, the fiber blend material 102 is combined with soil at a rate of 0.1-10 pounds of fiber blend material 102 per 100 pounds of soil. In another embodiment, for every square foot of the surface/subsurface to be covered, the fiber blend material 102 is combined with soil at a rate of 0.2-8 pounds of fiber blend material 102 per 100 pounds of soil. In another embodiment, for every square foot of the surface/subsurface to be covered, the fiber blend material 102 is combined with soil at a rate of 0.25-4 pounds of fiber blend material 102 per 100 pounds of soil. In another embodiment, for every square foot of the surface/subsurface to be covered, the fiber blend material 102 is combined with soil at a rate of 0.25-2 pounds of fiber blend material 102 per 100 pounds of soil.

In one or more embodiments, the materials of the present invention are used to create a convertible surface using the fiber blend material 102. In one or more embodiments, the materials of the present invention are used in a ratio that varies depending upon the bulk density of the soil type and the needed energy of restitution, measured by the coefficient of restitution, the pore space, permeability, moisture levels, density, compressibility and overall physical characteristics and specifications needed by the application, whether its used as a sub-grade, surface, or erosion control, vegetative growth amendment, etc. In the present engineered surfaces, all qualities and quantities of the blend are interactive. Simply put, the heavier the bulk substrate, the lighter the additive. In one or more embodiments, the materials of the present invention are used to create a convertible surface using the fiber blend material 102, wherein the fiber blend material 102 does not contain SAP.

The oven dry weight of a unit volume of soil inclusive of pore spaces is called bulk density. The bulk density of a soil is always smaller than its particle density. The bulk density of sandy soil is about 1.6 g/cm3, whereas that of organic matter is about 0.5. Bulk density normally decreases, as mineral soils become finer in texture. The bulk density varies indirectly with the total pore space present in the soil and gives a good estimate of the porosity of the soil. Bulk density is of greater importance than particle density in understanding the physical behavior of the soil. Generally soils with low bulk densities have favorable physical conditions. Bulk density of different textural classes is generally from about 1.1 g/cm3 (clay) to about 1.6 g/cm3 (sandy). The pore space of different textural classes is generally from about 40 percent (sandy) to about 58 percent (clay).

Clay is one of the many types of soils that are distinguished as soil in which the particles are packed tightly together with each other with little or no air space. Because of this characteristic, clay is the densest and heaviest type of soil. Silty soil is extremely smooth and since it retains plenty of water, it is fertile. Silty soil is ideal for agricultural use as the particles in silty soil are miniscule. Loamy soil is one of the perfect types of soil because it is a mix of sand, clay, silt and even some humus. It is also well aerated. The specific composition of loamy soil can vary.

In one or more embodiments, the materials of the present invention are used with heavier bulk density soils such as sand at a ratio of from about 10:1 to about 100:1. In one or more embodiments, the materials of the present invention are used with heavier bulk density soils such as sand at a ratio of from about 12:1 to about 48:1. In one or more embodiments, the materials of the present invention are used with heavier bulk density soils such as sand at a ratio of from about 16:1 to about 32:1.

In one or more embodiments, the materials of the present invention are used with lighter bulk density soils such as loamy, silt, and clay at a ratio of form about 16:1 to about 200:1 is used. In one or more embodiments, the materials of the present invention are used with lighter bulk density soils such as loamy, silt, and clay at a ratio of form about 24:1 to about 125:1 is used. In one or more embodiments, the materials of the present invention are used with lighter bulk density soils such as loamy, silt, and clay at a ratio of form about 32:1 to about 64:1 is used.

In one or more embodiments, the materials of the present invention are used with very light bulk density soils such as loamy, silt, and clay at a ratio of form about 40:1 to about 200:1 is used. In one or more embodiments, the materials of the present invention are used with lighter bulk density soils such as loamy, silt, and clay at a ratio of form about 125:1 to about 175:1 is used.

In one or more embodiments, the materials of the present invention are used to make a base that is the perfect subgrade that can then be used to transition to a natural surface such as a natural turf or grass field surface. In one or more embodiments, the materials of the present invention are used to prepare a fiber and sand mix base. When the engineered surface is changed at a later date, the blend of fibers and sand acts as a synthetic root system. If the original surface is a dirt surface, then fibers are incorporated into the soil/dirt surface to create a base. That is, a base created by a sand and fiber mix on the top surface or by tilling the sand and fiber mix into earth. In one or more embodiments, the fiber mixture is placed put down, then a layer of sand is placed on top of the fiber mixture layer and the two are compacted together for use as a base, play field, play surface, road, etc., that are easily converted to a different surface type later. In one or more embodiments, a synthetic surface can be placed on top of the compacted sand and fiber. In one or more embodiments, the compacted sand and fiber mixture [convertible surface] provides vegetative growth/synth root system that is from about 0.5 inches to about 3 inches in depth. In one or more embodiments, the compacted sand and fiber mixture comprises from about 1 to about 10 pounds of subangular sand per square foot. In one or more other embodiments, the compacted sand and fiber mixture comprises from about 2 to about 8 pounds of subangular sand per square foot. In one or more other embodiments, the compacted sand and fiber mixture comprises from about 3 to about 7 pounds of subangular sand per square foot.

In one or more equestrian embodiments, the compacted sand and fiber mixture is from about 2 inches to about 6 inches in depth. In one or more embodiments, the fiber mixture comprises from about 0.5 inches to about 3 inches of fiber blend per square foot. In one or more embodiments, the fiber mixture comprises from about 0.1 pounds to about 0.3 pounds of fiber blend per square foot.

In one or more other embodiments, the compacted sand and fiber mixture comprises from about 2 to about 8 pounds of subangular sand per square foot. In one or more other embodiments, the compacted sand and fiber mixture comprises from about 3 to about 7 pounds of subangular sand per square foot.

In one or more other embodiments, the engineered surface of the present invention can be used as an artificial runway surface suitable for supporting takeoff, landing and taxiing of aircraft. The engineered surface system cures many of the problems and pitfalls associated with natural grass systems, such as rutting, bare spots, unevenness, standing water as well as other problems associated with natural grass surfaces.

In one or more embodiments, the fiber mixture used for the engineered surface comprises: 1) at least 40 wt. % nonwoven fabric; 2) Fiber-which resembles a yarn like material; 3) Nonwoven Fluff; and 4) superabsorbent polymer (SAP) coating one or more of the footing components; wherein the superabsorbent polymer (SAP) constitutes 1-10 wt. % of the material.

In one or more embodiments, the fiber mixture used for the engineered surface comprises: SAP coated nonwoven fabric: at least 40 wt. %; Non-treated nonwoven fabric: up to 60 wt. %; and fibers: 0-30 wt. %; Nonwoven fluff: 0-30 wt. %; wherein the superabsorbent polymer (SAP) constitutes 1-10 wt. % of the material.

In one or more embodiments, the fiber mixture used for the engineered surface comprises: SAP coated nonwoven fabric: at least 40 wt. %; Non-treated nonwoven fabric: up to 60 wt. %; Fibers: 15-30 wt. %; and Nonwoven fluff: 15-30 wt. %; wherein the superabsorbent polymer (SAP) constitutes 1-7.5 wt. % of the material.

In one or more embodiments, the fiber mixture used for the engineered surface comprises: SAP coated nonwoven fabric: 20-40 wt. %; Non-treated nonwoven fabric: 20-60 wt. %; Fibers: 20-30 wt. %; and Nonwoven fluff: 20-30 wt. %; wherein the superabsorbent polymer (SAP) constitutes 1-5 wt. % of the material.

In one or more embodiments, the fiber mixture used for the engineered surface comprises: 20-30 wt. % SAP coated nonwoven polyester fabric; 40-60 wt. % non-treated nonwoven polyester fabric; 20-30 wt. % Fibers; and 20-30 wt. % Nonwoven fluff; wherein the superabsorbent polymer (SAP) constitutes 2-5 wt. % of the material.

Equestrian Surfaces

In one embodiment, the materials of the present invention are used to create a horse arena surface using a blend of the footing material blend and sand. In one embodiment, for every square foot of the arena to be covered, the amount of sand and footing is from about 25-100 lbs. of sand combined with 0.2-10 pounds of the footing blend. In another embodiment, for every square foot of the arena, the amount of sand and footing is from about 40-80 lbs. of sand combined with 0.2-8 pounds of the footing blend. In another embodiment, for every square foot of arena surfacing, the amount of sand and footing is from about 45-60 lbs. of sand combined with 0.25-4 pounds of the footing blend. In another embodiment, for every square foot of the arena, the amount of sand and footing is from about 45-60 pounds of sand combined with 0.25-2 pounds of the footing blend.

In one or more embodiments, the SAP engineered surface comprises nonwoven fabric and superabsorbent polymer (SAP) coating one or more of the nonwoven fabric. In another embodiment, the surface further comprises at least 40 wt. % nonwoven fabric and 1-10 wt. % superabsorbent polymer (SAP) coating the nonwoven fabric. In another embodiment, the surface further comprises one or more materials selected from the group consisting of fibers and nonwoven "fluff"—a high-lofted, light denier nonwoven fiber material. In another embodiment, the surface further comprises 0-30 wt. % of fibers. In another embodiment, the footing further comprises 0-30 wt. % of nonwoven fluff.

Third party testing by an engineer revealed that our footing product created an unexpected benefit. Even after surface drying, the arena footing and substrate, remains cohesive and firm in the lower half of the substrate, increasing the safety to the horse and preventing tendon and ligament strains The surface blend can be calibrated to create a range of footing conditions and firmness. Much like the phenomenon on a beach where the gradation of firmness is very pronounced from the dry sand far from the water to the firm sand between the dry sand and waterline. Space footing can create a footing condition anywhere within the range of dry to saturated.

In one or more embodiments, the polymer-based goods utilize 4 oz. nonwoven polyester in a range from about 2 to about 12 ounces. In one or more embodiments, the nonwoven polyester is in a range from about 3 to about 8 ounces. Any polymer-based fabric can be coated. The contents of the bath are an aqueous super absorbent polymer and a calibrated dilution rate of water. For example, a series of 42 or more steamed heat cans are calibrated to 200-275° F. The material (1) SAP Non Woven Polyester, (2) Non—Treated Polyester non-woven, (3) Fiber (which resembles a yarn like material), and (4) "Fluff" (which resembles cotton like material) are conveyed to a series of cutters and sent through a chute into a blending machine that turns the fabric over several times to create a homogenous mixture. The resulting material can be mixed with particles of rubber, sand, clay, rock, soil, etc., as well as mixtures thereof.

In one or more embodiments, the surface comprises from about 0.25 to about 5 pounds of footing per square foot mixed with a 2-8 inch sand profile. In one or more embodiments, the surface comprises from about 0.5 to about 3 pounds of footing per square foot mixed with a 3-6 inch sand profile. In one or more embodiments, the surface comprises from about 0.5 to about 2 pounds of footing per square foot mixed with a 3-6 inch sand profile. Typical size of an arena is 16,000 square feet.

Water-based SAP can be applied topically within the arena, on various arena substrates/surfaces, including but not limited to: rubber particles, sand, wood chippings, grass, soil, fiber, textile, clay or rock or by using a fluidized bed and coating methods listed herein and coatings can be introduced in the production line on substrates such a fiber, felt, rubber, non wovens, cotton, rubber particles, sand, wood chippings, grass, soil, fiber, textile, clay or rock.

In one or more embodiments, the engineered surface is for a rodeo surface that comprises from about 2 to about 8 pounds of footing blend per square foot layered onto an existing soil surface. In another embodiment, the engineered surface is for a rodeo surface that comprises from about 3 to about 7 pounds of footing blend per square foot layered onto an existing soil surface. In another embodiment, the engineered surface is for a rodeo surface that comprises from about 4 to about 6 pounds of footing blend per square foot layered onto an existing soil surface.

In one or more embodiments, the surface comprises from about 3 to about 7 pounds of footing per square foot mixed with a 3-6 inch sand profile. In one or more embodiments, the surface comprises from about 4 to about 6 pounds of footing per square foot mixed with a 3-6 inch sand profile. Typical size of an arena is 16,000 square feet.

In one or more embodiments for rodeo use, the SAP footing comprises: 1) at least 40 wt. % nonwoven fabric textile (polypropylene and polyester); 2) at least 20% fiber (polyester)—which resembles a yarn like material; 3) at least 20% nonwoven fluff (high lofted nonwoven polyester); and 4) superabsorbent polymer (SAP) coating one or more of the footing components; wherein the superabsorbent polymer (SAP) constitutes 1-10 wt. % of the footing material. In one or more embodiments for rodeo use, the SAP footing comprises: 1) at least 60 wt. % nonwoven fabric textile (polypropylene and polyester); 2) at least 20% fiber (polyester)—which resembles a yarn like material; 3) at least 20% nonwoven fluff (high lofted nonwoven polyester); and 4) superabsorbent polymer (SAP) coating one or more of the footing components; wherein the superabsorbent polymer (SAP) constitutes 1-10 wt. % of the footing material.

In one or more embodiments for rodeo use, the engineered surface further comprises a mix of silica sand. In one or more embodiments for rodeo use, the engineered surface further comprises a drainage mat (butterfly mats) made of geotextile or landscape fabric. In one or more embodiments for rodeo use, the engineered surface further comprises a base of compacted gravel.

Animal Bedding

In another embodiment, the materials of the present invention are used to create an animal bedding surface using the engineered surface material blend. The engineered surface material blend provided by the present invention has the benefit of providing stables or other animal containment areas with a fiber blend to be used as bedding for the animal. The animal bedding provided has the ability to reduce infection within the stable after surgery, etc. The animal bedding also provides for a stable, dust free, antimicrobial environment for the animal to heal within. In fairgrounds, equestrian centers, farms, animal cages, pet cages, etc. the animal bedding also provides for a dust free, super absorbent environment, that is free of bacteria, reduces the need for frequent replacement.

In one or more embodiments, the engineered surface material blend provided by the present invention is used for animal bedding by incorporating the material on top of a bedding mat, concrete, a drainage mat, dirt, sand surface or combination thereof. In one or more embodiments, the engineered surface material blend provided by the present invention is used for animal bedding by tilling into the substrate. In one or more embodiments, the engineered surface material blend provided by the present invention is used for animal bedding by laying down a mix of fibers and sand and compacting the mixtures.

In one embodiment, the animal bedding blend is provided as a blend of 80%-90% "fluff" (high lofted PET) and 10%-20% SAP coated textile. In one embodiment, the animal bedding blend is provided at about 0.1 to about 3 lbs/sq ft. In another embodiment, the animal bedding blend is provided at about 0.1 to about 2 lbs/sq ft. In another embodiment, the animal bedding blend is provided at about 0.1 to about 1 lbs/sq ft. In another embodiment, the animal bedding blend is provided at about 0.25 to about 0.75 lbs/sq ft. In another embodiment, the animal bedding blend is provided at about 0.5 lbs/sq ft.

In one embodiment, for every square foot of the area to be covered, the amount of sand and footing is from about 25-100 lbs. of sand combined with 0.2-10 pounds of the footing blend. In another embodiment, for every square foot of the bedding area, the amount of sand and footing is from about 40-80 lbs. of sand combined with 0.2-8 pounds of the footing blend. In another embodiment, for every square foot of bedding surfacing, the amount of sand and footing is from about 45-60 lbs. of sand combined with 0.25-4 pounds of the footing blend. In another embodiment, for every square foot of the bedding surfacing, the amount of sand and footing is from about 45-60 pounds of sand combined with 0.25-2 pounds of the footing blend.

In one or more embodiments, the SAP animal bedding engineered surface comprises nonwoven fabric and superabsorbent polymer (SAP) coating one or more of the nonwoven fabric. In another embodiment, the animal bedding further comprises at least 40 wt. % nonwoven fabric and 1-10 wt. % superabsorbent polymer (SAP) coating the nonwoven fabric. In another embodiment, the animal bedding further comprises one or more materials selected from the group consisting of fibers and nonwoven "fluff"—a high-lofted, light denier nonwoven fiber material. In another embodiment, the animal bedding further comprises 0-30 wt. % of fibers. In another embodiment, the footing further comprises 0-30 wt. % of nonwoven fluff.

In one or more embodiments for bedding use, the surface comprises: 1) at least 40 wt. % nonwoven fabric textile (polypropylene and polyester); 2) at least 20% fiber (polyester)—which resembles a yarn like material; 3) at least 20% nonwoven fluff (high lofted nonwoven polyester); and 4) superabsorbent polymer (SAP) coating one or more of the footing components; wherein the superabsorbent polymer (SAP) constitutes 1-10 wt. % of the footing material. In another embodiment for bedding use, the surface comprises: 1) at least 60 wt. % nonwoven fabric textile (polypropylene and polyester); 2) at least 20% fiber (polyester)—which resembles a yarn like material; 3) at least 20% nonwoven fluff (high lofted nonwoven polyester); and 4) superabsorbent polymer (SAP) coating one or more of the footing components; wherein the superabsorbent polymer (SAP) constitutes 1-10 wt. % of the footing material.

In one or more embodiments for bedding use, the engineered surface further comprises a mix of silica sand. In one or more embodiments for bedding use, the engineered surface further comprises a drainage mat (butterfly mats) made of geotextile or landscape fabric. In one or more embodiments for bedding use, the engineered surface further comprises a base of compacted gravel.

In one or more embodiments for bedding use, performance-enhancing additive(s) are added to the engineered surface. In one embodiment, the performance-enhancing additive(s) are antimicrobials. In one embodiment, the antimicrobial actives are boron containing compounds such as borax pentahydrate, borax decahydrate, boric acid, polyborate, tetraboric acid, sodium metaborate, anhydrous, boron components of polymers, and mixtures thereof. In still another embodiment of the present invention, the bedding may be treated with various additives, known to persons of skill in the art, to provide the desirable properties or otherwise enhance the animal bedding. Such additives may include aluminum sulfate (i.e., alum), boric acid and selected antimicrobial agents. Alum may be added to the absorbent and/or support layers in an amount from about 2 pounds per ton to about 20 pounds per ton. Alum may act to control the amount of ammonia and soluble phosphorus and as a fire retardant.

In one or more embodiments, the SAP animal bedding comprises:
1) at least 40 wt. % nonwoven fabric
2) Fiber-which resembles a yarn like material; and
3) Nonwoven Fluff; and 4) superabsorbent polymer (SAP) coating one or more of the footing components; wherein the superabsorbent polymer (SAP) constitutes 1-10 wt. % of the bedding material.

In one or more embodiments, the SAP animal bedding comprises:
SAP coated nonwoven fabric: at least 10 wt. %
Non-treated nonwoven fabric: up to 90 wt. %
Fibers: 0-30 wt. %
Nonwoven fluff: 0-30 wt. %
wherein the superabsorbent polymer (SAP) constitutes 1-10 wt. % of the footing material.

In one or more embodiments, the SAP animal bedding comprises:
At least 40-90 wt. % nonwoven polyester fabric (wherein at least 20% of the fabric is SAP coated)
5-30 wt. % Fibers
5-40 wt. % Nonwoven fluff
wherein the superabsorbent polymer (SAP) constitutes 2-5 wt. % of the bedding material.

The engineered surface blend can be calibrated to create a range of conditions and firmness depending on moisture wick/resilience, etc. Much like the phenomenon on a beach where the gradation of firmness is very pronounced from the dry sand far from the water to the firm sand between the dry sand and waterline.

In one or more embodiments, the polymer-based goods utilize 4 oz. nonwoven polyester in a range from about 2 to about 12 ounces. In one or more embodiments, the nonwoven polyester is in a range from about 3 to about 8 ounces. Any polymer-based fabric can be coated. The contents of the bath are an aqueous super absorbent polymer and a calibrated dilution rate of water. For example, a series of 42 or more steamed heat cans are calibrated to 200-275° F. The material (1) SAP-treated Non Woven Polyester, (2) Non—Treated Polyester non-woven, (3) Fiber (which resembles a yarn like material), and (4) "Fluff" (which resembles cotton like material) are conveyed to a series of cutters and sent through a chute into a blending machine that turns the fabric over several times to create a homogenous mixture. The resulting material can be mixed with particles of rubber, sand, clay, rock, soil, etc., as well as mixtures thereof.

In one or more embodiments, the surface comprises from about 0.25 to about 5 pounds of footing per square foot mixed with a 2-8 inch sand profile. In one or more embodiments, the surface comprises from about 0.5 to about 3 pounds of footing per square foot mixed with a 3-6 inch sand profile. In one or more embodiments, the surface comprises from about 0.5 to about 2 pounds of footing per square foot mixed with a 3-6 inch sand profile. Typical size of an arena is 16,000 square feet.

The animal bedding can also include various substrates/surfaces, including but not limited to: rubber particles, sand, wood chippings, grass, soil, fiber, textile, clay or rock or by using a fluidized bed and coating methods listed herein and coatings can be introduced in the production line on substrates such a fiber, felt, rubber, non wovens, cotton, rubber particles, sand, wood chippings, grass, soil, fiber, textile, clay or rock.

The typical installation for animal bedding entails distributing the material throughout the area in a weighted, uniform fashion. The material is then wetted to allow for easier blending because of the weight of the material versus the sand substrate. The material is then blended by means of tilling equipment (grooming, rake, brush, tiller, farm equipment), thereby creating a complete homogenous mixture of sand and the fabric-fiber blend. The material is then tested for feel and comfort of the horse. Depending on the climate, the typical bedding material is watered 1-3 times daily although less frequent watering may be used.

Exemplary Embodiments of the Engineered Surfaces

Referring to FIG. 1A, an engineered surface 100 is provided wherein a fiber blend material 102 in accordance with the invention may be layered on top of a substrate 104 or mixed into the top portion of the substrate 104. In one embodiment of the surface and method in accordance with the invention, the fiber blend material 102 may be poured, as if it were simply sand or other substrate alone onto a substrate 104 surface. It may be broadcast with turf spreading apparatus used to distribute fertilizers and top dressing. Optionally, it may then be worked into the soil by harrowing, disking, raking, or the like, which provides the best results.

In certain embodiments, the fiber blend material 102 may be mixed into the soil substrate 104 close to the top surface as a soil amendment. Mixing may be done by any suitable means, rendering the surface usable. Also, the SAP fiber blend may be mixed in as preparation to maintain a consistent hydration in the soil.

In one embodiment of the engineered surface 100, the material may be spread on a surface and then raked or mixed into, typically, the top ½ inch to 8 inches of the soil to be treated, depending on the functional purpose of the soil. In another embodiment, the material may be spread on a surface and then raked or mixed into, typically, the top ½ inch to 4 inches of the soil to be treated, depending on the functional purpose of the soil.

Referring to FIG. 1B, an engineered surface material blend 106 in accordance with the invention may be layered on top of a substrate 104 or mixed into the top portion of the substrate 104.

In one embodiment of the surface and method in accordance with the invention, the engineered surface material blend 106 may be the fiber blend material 102 alone placed on a soil surface. In one embodiment of the surface and method in accordance with the invention, the engineered surface material blend 106 may be the fiber blend material 102 mixed with sand and/or aggregate and placed on a soil surface. In one embodiment of the surface and method in accordance with the invention, the engineered surface material blend 106 may be the fiber blend material 102 placed on top of the substrate and then a layer of crushed or broken gravel, stone, or other aggregate is placed on top of the fiber blend material 102 in order to create a road capable of vehicular traffic. In one or more embodiments, the layer of the fiber blend material 102 is from about 1-4 inches in thickness. In one or more embodiments, the layer of gravel, stone or aggregate is from 1-10 inches in thickness.

In one embodiment of the surface and method in accordance with the invention, the engineered surface material blend 106 may be poured, as if it were simply sand or other substrate alone onto a substrate 104 surface. It may be broadcast with turf spreading apparatus used to distribute fertilizers and top dressing. Optionally, it may then be worked into the soil by harrowing, disking, raking, or the like, which provides the best results.

In certain embodiments of the engineered surface 100, the engineered surface material blend 106 may be mixed into the soil substrate 104 close to the top surface as a soil amendment. Mixing may be done by any suitable means, rendering the surface usable. Also, the resulting engineered surface material blend 106 may be mixed in as preparation to maintain a consistent hydration in the soil.

In one embodiment, the material may be spread on a surface and then raked or mixed into, typically, the top ½ inch to 8 inches of the soil to be treated, depending on the functional purpose of the soil. In another embodiment, the material may be spread on a surface and then raked or mixed into, typically, the top ½ inch to 4 inches of the soil to be treated, depending on the functional purpose of the soil.

In certain embodiments of the engineered surface 100, the soil substrate 104 can be subbed-out 4 to 6 inches in a renovation or new construction project, then back-filled with the proper mix manufactured with a blending machine.

Soil based surfaces may require an irrigation system to control dust and ensure proper moisture levels. Automatic and manual water systems are available such as interior sprinklers, perimeter sprinklers, a water tractor, or portable sprinkler system (such as the Kifco watering system). The amount of water needed depends on the soil profile, climate, and frequency of play.

In certain embodiments of the engineered surface 100, the surface is adjected to ensure safety. There are two standard measurements to quantify the safety of a field: the G-max test and the Head Injury Criterian (HIC). The G-max test is common when evaluating the firmness of a sports field and measures the force exerted on a surface by dropping a weighted cylinder. These tests are typically used when evaluating synthetic turf and are not required for the evaluation of natural grass or baseball infields. Currently, the American Society for Testing and Materials (ASTM) states that a G-max score of 165 is allowed on synthetic turf fields with discussions of lowering the upper limit to 120 soon. A G-max score of 200 can result in fatal head trauma. The HIC is a measurement of the likelihood of head injury from the impact of a given surface. Concussions are found to occur in most athletes at a score of 250 with 700 being the maximum acceptable score that could result in severe injury. Therefore, the engineered surface 100 should maintain a G-max score less than 165. In some embodiments, the engineered surface 100 should maintain a G-max score less than 120. In some embodiments, the engineered surface 100 should maintain an HIC measurement less that 250. In some embodiments, the engineered surface 100 should maintain an HIC measurement less that 200.

Referring to FIG. 2A, an engineered surface material blend 106 in accordance with the invention as described herein may be advantageously laid down on the substrate 104 over a layer of material that will provide good drainage such as a drainage underlayer or aggregate layer 108. While the surface can be laid over practically any type of surface, for example, cement, dirt, clay and turf, it is preferable for indoor application to lay it over cement or dirt to maximize the drainage benefits of the present invention. In certain indoor applications, the surface is laid over cement. In use, rain or irrigation water quickly penetrates and drains through the composition. This is an advantageous characteristic, and to be certain that the water will completely drain off the surface, an aggregate layer or other underlayment of, for example, crushed or broken gravel, stone, or other aggregate (e.g., quarry, granite or limestone fines or dust), or a mixture thereof, can be used for optimal drainage. To provide enhanced drainage functions, the drainage underlayer or aggregate layer 108 should can have a depth of about 3-7 inches and be full of 1-5 inches of aggregate, such as crushed washed stone, which is ¼ to 2 inches in diameter. In addition, a pipe (not shown) can be laid down with the crushed stone to facilitate rapid egress of any water. The size and uniformity of the drainage underlayer 108 are not critical so long as drainage is accomplished and the particulate mixture of the invention does not significantly penetrate the drainage underlayer 108. Other grounds surface compositions are equally possible.

In one or more embodiments, the drainage underlayer or aggregate layer 108 should can have a depth of about 1-20 inches of aggregate, such as crushed washed stone, which is ¼ to 2 inches in diameter. For lighter use, the thickness of the compacted base 108 is in one embodiment about two to three inches and consists of quarter inch minus road base, which is crushed rock having a diameter of about one quarter inch down to rock that has virtually a zero diameter, e.g., sand or dust. The different sized particles enable base 108 to be compressed to a more compacted state than if rolled rock or rock of approximately the same size diameter particulate is used. Such rolled and similarly sized particles create interstices regardless of how much pressure is applied to compact those materials. The quarter inch minus base 108 on the other hand can be compacted to greater than or equal to 90% (less than or equal to 10% air), in one embodiment greater than or equal to 95% compaction.

The drainage underlayer 108 can occupy the same linear dimensions in width and length as the engineered surface. However, it is contemplated that the drainage underlayer 108 can be longer, shorter, wider, or thinner than the engineered surface so long as the function of drainage is not significantly compromised. The composition is spread over the drainage underlayer 108 to a suitable depth of at least 4 inches, and preferably at least 5 to 6 inches. The thickness can be increased beyond these limits, but considerations of increased cost versus diminution of enhanced benefits impose practical limits on thickness. The compositions of the present invention can be used for long periods of time, for example, up to about 4 to 10 years, but eventually may require maintenance (e.g., refurbishing).

In one embodiment of the engineered surface 100, the engineered surface material blend 106 in accordance with the invention as described herein may be spread onto the drainage underlayer 108 surface, typically to a depth of ½ inch to 8 inches, depending on the functional purpose of the engineered surface. In another embodiment, the engineered surface material blend 106 may be spread onto the drainage underlayer 108 surface, typically to a depth of ½ inch to 4 inches of the soil to be treated, depending on the functional purpose of the soil.

Figure 2B:
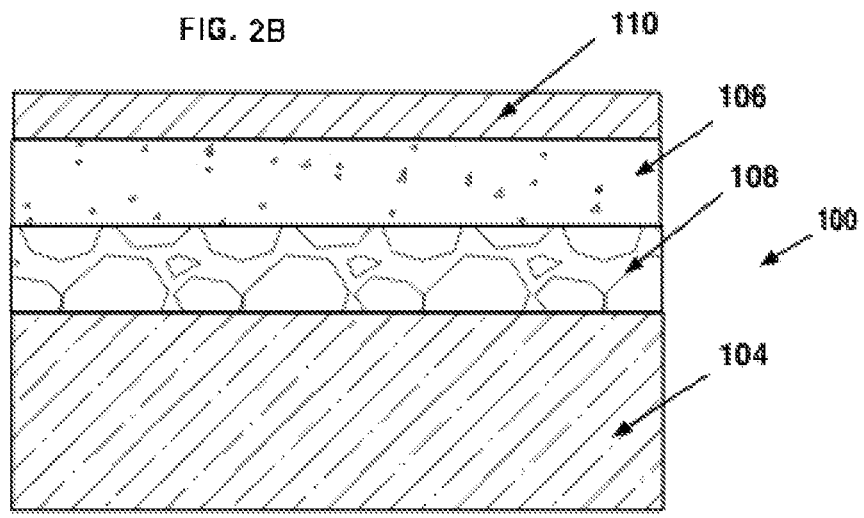
FIG. 2B is a further schematic cross-sectional view of a fourth example of the engineered surface according to the invention.

Referring to FIG. 2B, an engineered surface material blend 106 in accordance with the invention may be layered on top of a substrate 104 or mixed into the top portion of the substrate 104. In one embodiment of the surface and method in accordance with the invention, the engineered surface material blend 106 may be advantageously laid down on the substrate 104 over a layer of material that will provide good drainage such as a drainage underlayer or aggregate layer 108, as described above.

The engineered surface material blend 106 is spread over the drainage underlayer 108 to a suitable depth of at least 4 inches, and preferably at least 5 to 6 inches. In one embodiment, the engineered surface material blend 106 in accordance with the invention as described herein may be spread onto the drainage underlayer 108 surface, typically to a depth of ½ inch to 8 inches, depending on the functional purpose of the engineered surface. In another embodiment, the engineered surface material blend 106 may be spread onto the drainage underlayer 108 surface, typically to a depth of 1 inch to 6 inches of the soil to be treated, depending on the functional purpose of the soil.

In addition, a top dressing 110 layer can be laid on top of the engineered surface 100 and drainage underlayer 108. In one embodiment of the engineered surface 100, the top dressing 110 layer is a compacted layer of natural soil or a synthetic soil or may be a mix of natural soil and/or synthetic soil with conventional infill material, such as resilient particles, mineral particles or other types of infill materials.

Figure 3A:
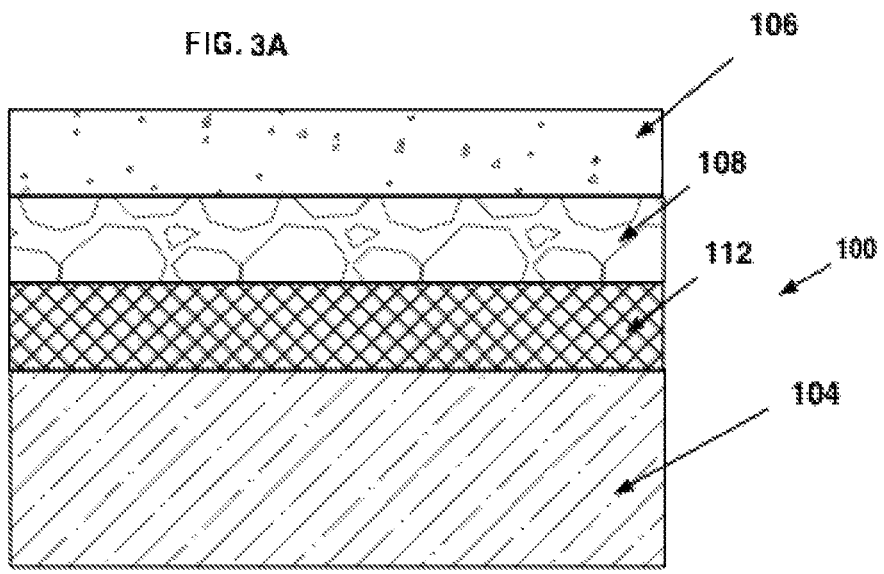
FIG. 3A is a schematic cross-sectional view of a fifth example of the engineered surface according to the invention.

Referring to FIG. 3A, in another embodiment of the engineered surface 100, an engineered surface material blend 106 in accordance with the invention may be layered on top of a substrate 104 or mixed into the top portion of the substrate 104. In one embodiment of the engineered surface 100 and method in accordance with the invention, the engineered surface material blend 106 may be advantageously laid down on the substrate 104 over a layer of material that will provide good drainage such as a drainage underlayer or aggregate layer 108, as described above. The drainage underlayer 108 is generally then compacted. The degree of compaction is generally 75-95%. In one or more embodiments, the degree of compaction is generally 85-99%.

In addition, a ripped and compacted natural site soil layer 112 can be interposed between the drainage underlayer 108 and the substrate 104. In one or more embodiments, the top layer of the substrate 104 is ripped or tilled up to a suitable depth of at least 4 inches and then compacted. In another embodiment, the top layer of the substrate 104 is ripped or tilled up to a suitable depth typically of 1 inch to 6 inches of the soil to be treated, depending on the functional purpose of the soil and then compacted. The degree of compaction is generally 80-98%. In one or more embodiments, the degree of compaction is generally 90-95%.

The engineered surface material blend 106 is spread over the drainage underlayer 108 to a suitable depth of at least 4 inches, and preferably at least 5 to 6 inches. In one embodiment, the engineered surface material blend 106 in accordance with the invention as described herein may be spread onto the drainage underlayer 108 surface, typically to a depth of ½ inch to 8 inches, depending on the functional purpose of the engineered surface. In another embodiment, the engineered surface material blend 106 may be spread onto the drainage underlayer 108 surface, typically to a depth of 1 inch to 6 inches of the soil to be treated, depending on the functional purpose of the soil.

Figure 3B:
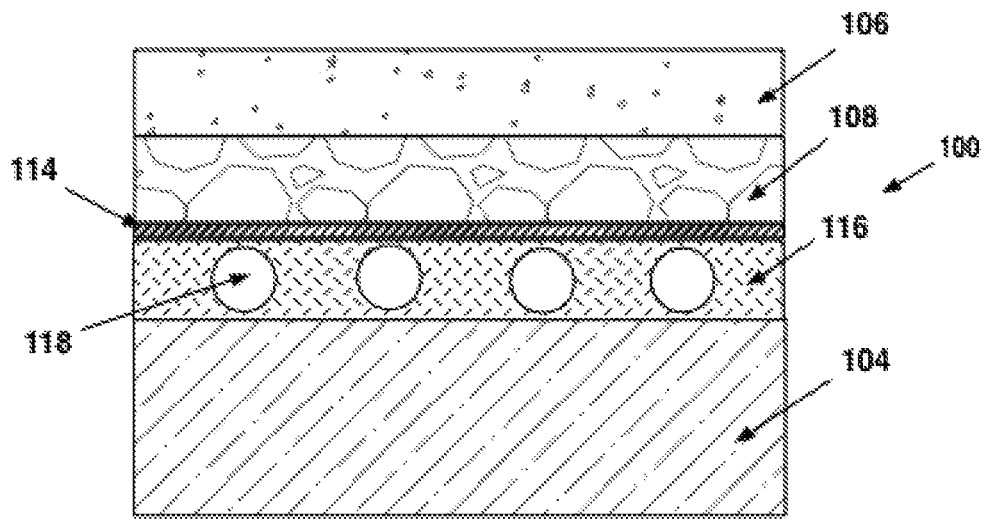
FIG. 3B is a further schematic cross-sectional view of a sixth example of the engineered surface according to the invention.

Referring to FIG. 3B, in another embodiment of the engineered surface 100, an engineered surface material blend 106 in accordance with the invention may be layered on top of a substrate 104 or mixed into the top portion of the substrate 104. In one embodiment of the engineered surface 100 and method in accordance with the invention, the engineered surface material blend 106 may be advantageously laid down on the substrate 104 over a layer of material that will provide good drainage such as a drainage underlayer or aggregate layer 108, as described above. The drainage underlayer 108 is generally then compacted. The degree of compaction is generally 75-95%. In one or more embodiments, the degree of compaction is generally 85-99%.

In one or more embodiments, an additional drainage layer 116 containing drainage pipes 118. In addition, a water-permeable separator layer 114, such as a suitable textile, felt, net mesh, other porous membrane layer, or a mixture thereof can be interposed between the engineered surface and the drainage layer. The separator layer can be a synthetic. In one embodiment of the present invention, a geotextile membrane separates the particulate materials of the invention, especially the sand, from the drainage materials (e.g., crushed stone). Covering the crushed stone with a porous membrane prevents the intermixing of the surface layer with the drainage area. Without a separator layer, the sand content of the surface layer can ultimately leach into the crushed stone, thereby reducing drainage and modifying the composition of the surface layer, or at least that portion which is closest to the crushed stone. Suitable separator materials are chosen based on the particle size of the surface composition, its durability and its resistance to deterioration. Any material is satisfactory so long as it allows water to pass through it, while blocking the passage of any particulate matter.

Referring to FIG. 4A, in another embodiment of the engineered surface 100, an engineered surface material blend 106 in accordance with the invention may be layered on top of a substrate 104 or mixed into the top portion of the substrate 104. In one embodiment of the engineered surface 100 and method in accordance with the invention, the engineered surface material blend 106 may be advantageously laid down on the substrate 104 and compacted wherein an artificial turf layer 115 is placed over the compacted engineered surface material blend 106. The artificial turf layer 115 comprises artificial grass 120 with a top layer of turf infill 122.

Referring to FIG. 4B, in another embodiment of the engineered surface 100, an engineered surface material blend 106 may be advantageously laid down on the substrate 104 over a layer of material that will provide good drainage such as a drainage underlayer or aggregate layer 108, as described above. In one embodiment, the engineered surface material blend 106 may comprise only the fiber blend material 102, which may be poured onto a substrate 104 surface or drainage underlayer or aggregate layer 108.

In one embodiment, the drainage underlayer or aggregate layer 108 comprises a water permeable material that together with a drainage system ensures that no puddles collect on the pitch. In one embodiment, the drainage underlayer or aggregate layer 108 comprises a mixture of lava and/or rubber of approximately 5-15 cm depth applied over a foundation. In one embodiment, the drainage underlayer or aggregate layer 108 comprises an e-layer or elastic layer made from bonded rubber. This ensures the necessary shock absorption and energy rebound.

The drainage underlayer 108 is generally then compacted. The degree of compaction is generally 75-95%. In one or more embodiments, the degree of compaction is generally 85-99%.

In one embodiment of the engineered surface 100 and method in accordance with the invention, the engineered surface material blend 106 may be advantageously laid down on the substrate 104 and compacted wherein an artificial turf layer 115 is placed over the compacted engineered surface material blend 106. The artificial turf layer 115 comprises artificial grass 120 with a top layer of turf infill 122. The engineered surface material blend 106 is spread over the drainage underlayer 108 to a suitable depth of at least 4 inches, and preferably at least 5 to 6 inches. In one embodiment, the engineered surface material blend 106 in accordance with the invention as described herein may be spread onto the drainage underlayer 108 surface, typically to a depth of ½ inch to 8 inches, depending on the functional purpose of the engineered surface. In another embodiment, the engineered surface material blend 106 may be spread onto the drainage underlayer 108 surface, typically to a depth of 1 inch to 6 inches of the soil to be treated, depending on the functional purpose of the soil.

Referring to FIG. 5A, a engineered surface 100 is provided wherein a fiber blend material 102 in accordance with the invention may be layered on top of a substrate 104 or mixed into the top portion of the substrate 104. In one embodiment of the surface and method in accordance with the invention, the fiber blend material 102 may be poured, as if it were simply sand or other substrate alone onto a substrate 104 surface. In certain embodiments, the resulting engineered surface material blend 102 may be mixed into the soil substrate 104 close to the top surface as a soil amendment. Mixing may be done by any suitable means, rendering the surface usable. Also, the SAP fiber blend may be mixed in as preparation to maintain a consistent hydration in the soil.

In one embodiment of the engineered surface 100 and method in accordance with the invention, an artificial turf layer 115 is placed over the compacted fiber blend material 102. The artificial turf layer 115 comprises artificial grass 120 with a top layer of turf infill 122.

Referring to FIG. 5B, a engineered surface 100 is provided wherein a fiber blend material 102 in accordance with the invention may be advantageously laid down on the substrate 104 over a layer of material that will provide good drainage such as a resilient base 124 and a drainage underlayer or aggregate layer 108, as described above. The fiber blend material 102 is spread over the drainage underlayer 108 to a suitable depth of at least 4 inches, and preferably at least 5 to 6 inches. In one embodiment, the fiber blend material 102 in accordance with the invention as described herein may be spread onto the drainage underlayer 108 surface, typically to a depth of ½ inch to 8 inches, depending on the functional purpose of the engineered surface. In another embodiment, the fiber blend material 102 may be spread onto the drainage underlayer 108 surface, typically to a depth of 1 inch to 6 inches of the soil to be treated, depending on the functional purpose of the soil.

In one embodiment of the engineered surface 100 and method in accordance with the invention, an artificial turf layer 115 is placed over the compacted fiber blend material 102. The artificial turf layer 115 comprises artificial grass 120 with a top layer of turf infill 122.

In certain embodiments of the engineered surface 100, the engineered surface is graded to a desired slope, such as a 2% slope, which enables water to drain to a desirable area.

Alternate Method of Delivery of Biological Soil Nutrient System

In certain embodiments of the engineered surface 100, the fiber blend material 102 along with sand and/or engineered surface material blend 106 are delivered to the surface of the soil by being distributed below the surface of the soil by conventional means such as discing, Dryject™, Hydroject™, dragging or mixing operations.

In certain embodiments of the engineered surface 100, the engineered surface is created by utilizing different types of equipment to promote aeration of the soil. An exemplary type of machinery is developed the DryJect™ system, which is manufactured by DryJect Manufacturing, LLC in Hatboro, Pa., a Profile Products, LLC company. This hydro-injection system is utilized to relieve soil compaction which stifles root systems and reduce standing water on the surface of the lawn and/or turf. The DryJect™ equipment uses water to fracture the soil with the capability of simultaneously injecting large volumes of dry fertilizers, inorganic soil treatments and pesticides. In certain embodiments of the engineered surface 100, the engineered surface is created by delivering a fiber blend material 102 into a substrate 104 using an aeration or hydro-injection system. In one or more additional embodiments of the engineered surface 100, the engineered surface is created by delivering a fiber blend material 102 along with sand and/or engineered surface material blend 106 and into a substrate 104 using an aeration or hydro-injection system.

In one embodiment, the fiber blend material 102 along with sand and/or engineered surface material blend 106 are delivered to the surface of the soil by being distributed by a hydro injection system that utilizes water to produce a high pressure aeration hole approximately ¼ by ½ inch wide and from 2-10 inches deep depending the setting and depth of root system in the soil. The penetrating force of the hydro injection system allows the insertion of the engineered surfacing materials to the substrate. The aeration is very temporary and the aeration holes close after a short time.

In one embodiment, the surface area is prepared for creation and the equipment is calibrated to the appropriate depth of the target substrate system. The amount of fiber blend material and/or sand material required is calculated as 5 lbs to 500 lbs per 1,000 square feet (sq. ft.). The hydro injection system is loaded with the amount of fiber blend material and/or sand for the treatment area and initiates delivery to the soil.

In another embodiment of the delivery method, is a manual method of delivery using a spiked mechanism to produce the aeration holes. The fiber blend material and/or sand is placed into the holes by raking manually and is an effective method with smaller areas such as gardens and smaller lawns.

In addition, the invention provides a delivery system, which directly injects the fiber blend material and/or sand, into the rhizosphere of the root systems of newly laid sod, mature sports turf and landscaping areas, specifically, utilizing a soil aeration apparatus similar to the DryJect™ system (DryJect Manufacturing, LLC).

Coating Methods:

Slot Die Coating: Slot die coating technology is used to deposit a variety of liquid chemistries onto glass, stainless steel, and plastic substrates for the development and production of a broad range of applications. This is achieved through the precise metering the process fluid and dispensing it at a controlled rate while the coating die is precisely moved relative to the substrate—http://ntact.com/applications/slot-die-coating/

Fluidized Bed: Spray jets are introduced in the first chamber of the fluidized bed, and perceive amount of solution is added/sprayed on the fabric as it goes through the machinery. See, for example Carrier® vibrating fluid bed dryers.

Bath/Roller System: The non-woven source is attached to a core, laid out, and fed through the coating system. The first step of the process is the non-woven enters a bath filled with the aqueous super absorbent polymer. The material goes down through the bath and back up through a roller, which squeezes the excess solution back into the bath to avoid material waste.

Roll in Pan/Gravure: The gravure or roll in pan is similar to a nip where the bottom roll is half submerged in the solution to be coated. The solution will collect into the cells or if smooth along the outside wall of the roll, which applies the solution to the web as, it runs through the nip. At higher add-ons the material is saturated versus coated on one side through the nip.

Laminating and Transfer Coating: There are two common ways to "transfer coat" materials onto a substrate utilizing the slot die application: Wet Lamination and Dry Lamination. For wet lamination, the slot die applies the solution onto one substrate and then the second substrate is introduced to the wetted substrate and married together through a nip before the drying process.

In some versions, the wet lamination is used for a transfer coat method where the slot die applies the solution to a reusable release sheet. The nonwoven (second substrate) is introduced to the wetted release sheet and they are dried together. After the dryer, the release sheet would be stripped away leaving a coated non-woven, producing a surface coating on one side of the nonwoven.

Drying/Curing Methods:

In one embodiment, a one-part water-based superabsorbent polymer (WBSAP) formulation can be cured at high temperatures anywhere from 35-300° F. range. In one or more embodiments, the materials are cured at a temperature of from 35 to 300° F. In another embodiment, the materials are cured at a temperature of from 100 to 300° F. In another embodiment, the materials are cured at a temperature of from 150 to 300° F. In another embodiment, the materials are cured at a temperature of from 200 to 300° F. In another embodiment, the materials are cured at a temperature of from 250 to 275° F.

In another embodiment, a two-part formulation can be cured at any temperature above 40° F. In one or more embodiments, the materials are cured at a temperature of from 40 to 200° F. In another embodiment, the materials are cured at a temperature of from 40 to 150° F. In another embodiment, the materials are cured at a temperature of from 50 to 100° F.

SAP formulations can be chosen based on the application needs and conditions for example applied using the methods mentioned above, to the substrate either during a coating line operation or out in the field utilizing specially built in situ coating equipment.

Similar to coating methodology, there are several options for drying coated substrates. The most viable drying processes for the heavy coat weights that are targeted for the project included fluid bed, impingement, and infrared (IR) radiant heat methods, and steam cans.

Steam Can: Usually within a serpentine set up, the nonwoven material feeds through the steam can system. The steam cans are usually set to varying temperatures depending on the stage of the material. In one or more embodiments, a temperature in the range of 150-300° F. is sufficient. In another embodiment, a temperature in the range of 200-300° F. is used. In another embodiment, a temperature in the range of 225-275° F. is used. In another embodiment, a temperature in the range of 250-275° F. is used.

Fluid Bed dryers: are very popular, efficient and easy to control. Flotation drying uses a process in which the material is "floated" by opposing and offset hot air blasts. The material "floats" on the air blasts and travels in a sine wave path through the length of the dryer. The material is unsupported through the dryer sections, and as such draw control is basically non-existent for the span of the dryer.

Impingement drying: uses a similar process to flotation drying, but the material is fed over idlers and/or drive rollers. Usually in the shape of a long arch (which keeps the angle of contact between the substrate and support rollers equal to each other), the material is pulled and/or driven over these rollers and therefore there is improved draw control as compared to flotation drying. Also, tension can be imparted to the web, which can aid in the drying process. In the drying section, air can be impinged on either side, or in some cases, on both sides of the web.

In one or more embodiments, the textile materials are dried using a textile IR tunnel dryer or conveyor tunnel dryer. For example, the Xinfeng Textile IR tunnel dryer Model Number XF-70100, an infrared conveyor dryer and the RANAR Turbo Jet-Star series Infrared Jet Air Textile Conveyor Dryers, may be used.

Chopping and Blending Process: The finished SAP material is then chopped and blended into our SAP treated engineered surface. The material is then put through a series of cutters. After the cutters chop the material, the material is sent through a chute into a blending machine that turns the fabric over several times to create a homogenous mixture.

Additional Agents.

The engineered surface materials may include one or more of the following: colorants, such as dyes or pigments; an oil or oil-like material (water soluble, water insoluble, or a polymeric composition) that enhances the appearance, fragrance, longevity, and/or insect repellency of the engineered surface material; insecticides (e.g., DEET); fungicides; herbicides; fertilizers; nutrients; dust control agents; odor control agents; sunscreening agents; UV reactive curing agents, coatings, hardeners, binders, paints or pigments (e.g., UV cured monomer resins, especially for application to rubber or sand, including PMPTA); seed; erosion control materials (such as, for example, naturally derived vegetable binders); plant aging or plant decomposition accelerating materials; luminescent, fluorescent, or phosphorescent pigments or other reflective compounds or minerals; binding agents (both polymeric and non-polymeric for adhering the engineered surface materials together); wetting agents; polymeric materials (such as acrylic polymers) for anti-weathering and appearance enhancing; polyethylene polymers for providing a gloss; concrete sealers; water repellants or preservatives; and wood preservatives, protectors or sealants.

In one embodiment, the engineered surface material comprises a colorant. The colorant may be, for example, a dye or a pigment. The dye may be dry, in liquid form, or dissolved in a liquid carrier. The pigment may be dry, suspended in a liquid carrier or carried on a substrate such as polymer or glass beads. Further, the pigments may be in powder, pellet or granule form.

The dyes and pigments may be natural or synthetic. Preferred pigments include various iron oxides, carbon, and titanium dioxide. Other colorants that may be used include tannins, vegetable tints, other natural colorants derived from plants, synthetic dyes, food colorings, and the like. Preferably, the colorants are non-toxic. A colorant may be used individually or blended with another colorant to obtain any desired color.

In one or more embodiments where the engineered surface materials to be colored, the treatment for the engineered surface material may comprise a pigment and a binder. In one embodiment, the binder is an acrylic polymer system. In one embodiment, the binder is a silicate binder, although other binders could be used such as silicone or certain clays, e.g., kaolin or bentonite or a polymer binder system such as vinyl acetate, acrylics, styrene acrylics, co-polymer vinyl, polyacrylates, urethanes, methylcellulose, liginsulphonatc, polyvinyl alcohol, polyethylene wax emulsions, or mixtures therein.

In another embodiment, the engineered surface material of the footing composition comprises at least one oil (or oil-like) material that will enhance the appearance, fragrance and/or insect or animal repellency of the engineered surface material. The oil material may include one or more natural oils (plant derived or animal derived oils or their component fractions), one or more synthetic oils (including mineral oils and silicones), esters, chemical derivatives of any of the foregoing, or a combination thereof. The oil materials may additionally provide a benefit of dust suppression. Additionally the oils may be tinted.

The plant-derived natural oils may be, for example, neem oil, karanja oil, citronella oil, citrus oils, cinnamon oil (bark and leaf), eucalyptus oil, cedar oil, lemongrass oil, linseed oil, soybean oil, licorice oil, clove oil, mint oil, sweet birch oil, spearmint oil, peppermint oil, anise oil, bergamot oil, canola oil, castor oil, cedarwood oil, jojoba oil, lavandin oil, mustard seed oil, coconut oil, eue oil, tulsi oil, almond oil, cottonseed oil, corn oil, geranium oil, sesame oil, thyme oil, tung oil, rosemary oil, basil oil, fennel oil, ginger oil, grapefruit oil, mandarin oil, orange oil, pepper oil, rose oil, tangerine oil, tea tree oil, tea seed oil, balsam oil, bay oil, capsicum oil, caraway oil, cardamom oil, cassia oil, celery oil, cognac oil, dillweed oil, guaiacwood oil, juniper berry oil, lime oil, origanum oil, parsley oil, pimento leaf oil, a jowan oil, apricot oil, betel leaf oil, bawchi oil, chilly seed oil, clary sage oil, cubeb oil, curry leaf oil, frankincense oil, ginger grass oil, gulthria oil, heeng oil, jamrosa oil, kulanjan oil, kalaunji oil, linaloe berry oil, ban tulasi oil, bursera oil, cumin seed oil, cyperiol oil, gereniol oil, grape seed oil, hinoki oil, juniper leaf oil, laurel berry oil, lichen oil, mace oil, mango ginger oil, mentha pipereta oil, paparika oil, vetivert oil, wheat germ oil, watermelon oil, macassar oil, mentha citreta oil, musk melon oil, nar kachur oil, palmarosa oil, patchouli oil, perilla seed oil, pomegranite oil, pumpkin oil, tomar seed oil, cananga oil, herbal puja oil, avocado oil, safflower oil, abies alba needle oil, ambrette seed oil, amyris oil angelica root oil, artemisia oil, estragon oil, fir needle oil, galangal oil, galbanum oil, olibanum oil, palmarosa oil, patchouli oil, birch oil, cajeput oil, calamus oil, cananga oil, carrot oil, cistus oil, citron oil, coriander oil, costus oil, cypress oil, davana oil, dill wood oil, dwarf pine needle oil, elemi oil, guajac oil, hop oil, hyssop oil, chamomile, jasmine oil, larch oil, laurel leaf oil, lavender oil, lemon balm oil, limba pine oil, litsea cubeba oil, lovage oil, manuca oil, marjoran oil, milfoil oil, myrrh oil, myrtle oil, neroli oil, niauli oil, petit grain oil, rockrose oil, rosewood oil, sage oil, rue oil, sassafras oil, spik oil, tagetes oil, thuja oil, valerian oil, verbena oil, vervain oil, vetiver oil, wintergreen oil, wormwood oil, ylang ylang oil, olive oil, evening primrose oil, hazelnut oil, grape core oil, peach core oil, walnut oil, sunflower oil, sandalwood oil, tumeric oil, nutmeg oil, soy oil, vegetable oils, menthol oil, eucalyptol, camphor oil, cedar leaf oil, pine oil, red pine oil, or combinations thereof. Essential oils also have malodor mitigation charecteristics that go beyond masking odor and nuetralize the malodor source Potentially employable animal derived natural oils may include, for example, tallow oil or fish derived oil (e.g., cod liver oil or shark oil) and their component fractions.

One or more synthetic oils, including mineral oils, silicones and fatty acid esters, and their chemical derivatives, preferably non-toxic, may be used in lieu of or in combination with one or more of the natural oils. Examples of mineral oils include, for example, petroleum derived oils. The fatty acid esters, such as alkyl stearate, are formed by the combination of a medium to long chain alcohol with a suitable long chain fatty acid, which may be branched or unbranched.

In addition to natural oils, which may impart a fragrance to the engineered surface material, synthetic fragrance-imparting oils may be included in the engineered surface materials including, for example, acetophenone, C10-C20 aldehydes, allyl cyclohexyl propionate, ambroxan, amyl cinnamic aldehyde, amyl salicylate, anisaldehyde, aurantiol, benzaldehyde, benzyl acetate, benzyl salicylate, brahmanol, calone, cashmeran, cedramber, cedryl acetate, cinnamic alcohol, citral, citronellal, citronellol, citronellyl acetate, coumarin, cyclamen aldehyde, cyclopentadecanolide, damascone beta, dihydromyrcenol, dimethyl benzyl carbinyl acetate, diphenyl oxide, ethyl phenylacetate, ethyl vanillin, eugenol, evernyl, frambinone, galaxolide gamma-decalactone, geraniol, geranyl acetate, geranyl formate, geranyl nitrile, geranyl acetate, hedione, helional, heliotropin, cis-3-hexenyl acetate, cis-3-hexenyl salicylate, hexyl cinnamic aldehyde, hexyl salicylate, hivertal, hydroxycitronellal, indol, ionone alpha, isobornyl acetate, isobutyl quinoline, isoeugenol, iso E super, isogalbanate, cis-jasmone, lilial, linalool, linalyl acetate, lyral, maltol, methyl anthranilate, methyl benzoate, methyl cinnamate, methyl chavicol, methyl ionone gamma, methyl napthyl ketone, methyl octine carbonate, methyl salicylate, musk ketone, musk T, paracresyl acetate, phenoxyethyl isobutyrate, phenylacetaldehyde, phenylacetic acid, phenylacetaldehyde dimethyl acetal, phenylethyl acetate, phenylethyl alcohol, phenylethyl dimethyl carbinol, phenylethyl phenylacetate, phenylpropyl alcohol, rosalva, rosatol, rose oxide, sandela, styrallyl acetate, terpineol, tonalid, vanillin, vertacetal, vertofix, vetiveryl acetate, vertenex (PTBCHA), and combinations thereof.

In one embodiment, the engineered surface material comprises an oil material that will provide a pleasant scent to the engineered surface materials. A single oil or a variety of combinations of oils may be employed to arrive at a desired scent. Preferably, the treatment includes an effective amount of individual oils or combinations of oils sufficient to enhance the aroma of the engineered surface material being treated. The oils used in the treatment may release a scent for several months. Preferably, an amount of aroma-imparting oil or combination of oils effective to maintain a release of the desired scent for at least one month is employed. The oil materials may be supported on a substrate facilitating a timed-release or controlled-release of the oil material, such as polymer or glass beads, for example. Preferably, the beads are of sufficiently small size (approaching the size of colorant pigments) that they may be adequately distributed by foam. In an exemplary embodiment, a concentrated solution containing up to 40 percent by weight of an oil material and 60 percent by weight of a combination of surfactant and water, the combination of water and surfactant containing as much as 60 percent actives, may be employed. Depending upon the amount of treatment desired on the engineered surface material (or desired effect of the treatment) and the throughput of the engineered surface material being treated (e.g., the flow rate of the engineered surface material through an engineered surface material processing machine, such as a trommel device), the concentrated solution may be diluted down to a level that still facilitates foaming of the diluted solution onto the engineered surface material.

Synthetic and/or natural oils may be employed which have a wide range of different scents, including, for example, apple, cinnamon, pine, strawberry, blueberry, and citrus scents. In one embodiment, the natural and/or synthetic oils will enhance the natural aroma or the perceived natural aroma of various types of wood, and may include, for example, such oils as vetivert, sandalwood oil, cedar oil, patchouli, rosewood oil, pine oil, cypress oil, birch oil, agar, wormwood oil, oakwood oil, vanillin, isobornyl acetate, fir balsam oil, and combinations thereof. Plant extracts, including, for example, root extracts, herbal extracts, and bean extracts, such as vanilla extract, may further be included in the engineered surface material in order to provide a desired aroma. Plant extracts may also be effective in repelling or killing insects. One plant extract, which may be included in the engineered surface material, is limonene, an extract from citrus plants, which is not only highly effective in repelling and killing insects, but also is environmentally safe.

Although the engineered surface material may include a single oil, preferably a combination of oils is employed in an effective amount to provide each of an appearance enhancer, an insect repellant and a fragrance. One oil may provide one or more of these characteristics. Neem oil, citronella oil, karanga oil and nepetalactone oil are examples of some preferred oils, as they are especially effective oils in repelling insects.

In the case of water insoluble treatments for engineered surface material, such as the above described oil materials, the treatment may be emulsified or carried by a substrate such as polymer or glass beads. Further, the oils may be solubilized in a solvent, such as water, via a solubilizer.

The engineered surface material may additionally or alternatively comprise a luminescent, phosphorescent or fluorescent pigment or other reflective material for providing the engineered surface material with a glittering, shimmering or light-reflecting appearance. Examples of such pigments or other materials include mica, nacreous pigments, aluminum flakes, glass flakes, paint flakes or chips, glass beads and molybdenum disulfide. The mica (such as pearl mica) or other materials may also include layers of titanium oxide, iron oxides, silver, gold, copper, palladium, nickel and cobalt, metal alloys, or combinations thereof, which may provide a colored appearance to the reflective pigment.

The engineered surface material may additionally or alternatively comprise odor control agents. Such odor control agents may include commercially available materials such as SUPPRESS® manufactured by Westbridge Agricultural Products of Vista, Calif.

UV Stabilizers

The engineered surface composition may also include one or more binders. Such binders may include, for example, any of a wide variety of commercial materials, which may be acrylic, vinyl acetate or other polymer systems.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the present innovation pertains. Although a number of methods and materials similar or equivalent to those described herein can be used in the practice of the present innovation, the preferred materials and methods are described herein.

As will be appreciated by one having ordinary skill in the art, the methods and compositions of the present innovation substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present innovation are disclosed herein; however, it is to be understood that the disclosed embodiments are merely exemplary of the present innovation, which may be embodied in various forms. Therefore, specific structural and functional details disclosed herein are not to be interpreted as limiting, but merely as a basis for the claims and as a representative basis for teaching one skilled in the art to variously employ the present innovation in virtually any appropriately detailed structure.

While it is apparent that the illustrative embodiments of the present innovation herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present innovation.

What is claimed is:

1. A moisture holding fiber blend material comprising:
   superabsorbent polymer (SAP) coated non-woven fabric materials;
   untreated non-woven fabric materials;
   polymeric materials, including staple fibers and particles; and
   fluff, a natural and/or synthetic cotton-like material that is generally a fibrous mass of natural and/or synthetic fibers, intertwined and entangled to form a cohesive unit of fibers and held together by interfacial friction and surface energy,
   wherein the moisture holding fiber blend material is blended as a particulate mixture that may be applied to a substrate or mixed with a substrate to form an engineered earthen recreation and sports surface that requires minimal irrigation and maintenance.

2. The fiber blend holding material of claim 1, wherein the superabsorbent polymer (SAP) comprises from 0.5 wt. % to 10 wt. % of the total weight.

3. A method comprising:
   providing a fiber blend moisture holding material comprising:
      a first non-woven fabric coated in an aqueous superabsorbent polymer (SAP); a second non-woven fabric; fiber; and
      a fluff material; and
   blending the moisture holding material with fill to form an engineered surface.

4. The fiber blend holding material of claim 1, wherein the first non-woven fabric coated in the aqueous SAP comprises a selected amount in a range of 20-40% of a total amount, the second non-woven fabric comprises a selected amount in a range of 40%-60% of the total amount, the fiber comprises a select amount in a range of 20%-30% of the total amount, and the fluff material comprises a selected amount in a range of 20%-30% of the total amount.

5. The fiber blend holding material of claim 1, wherein the first non-woven fabric coated in the aqueous SAP comprises 20% of the total amount, the second non-woven fabric comprises 40% of the total amount, the fiber comprises 20% of the total amount, and the fluff material comprises 20% of the total amount.

6. An engineered surface comprising:
   a soil substrate; and
   a fiber blend material incorporated into the soil substrate, wherein the fiber blend material comprises (i) superabsorbent polymer (SAP) coated non-woven fabric materials; (ii) untreated non-woven fabric materials; (iii) polymeric materials, including staple fibers and particles; and (iv) fluff, a natural and/or synthetic cotton-like material that is generally a fibrous mass of natural and/or synthetic fibers, intertwined and entangled to form a cohesive unit of fibers and held together by interfacial friction and surface energy.

7. The engineered surface of claim 6, wherein the fiber blend material is incorporated into the soil substrate as a soil amendment.

8. The engineered surface of claim 6, wherein the engineered surface further comprises a drainage underlayer or aggregate layer.

9. An engineered surface comprising:
sand; and
fiber blend material placed on a substrate, wherein the engineered surface is made of the sand combined with the fiber blend material comprising: (i) superabsorbent polymer (SAP) coated non-woven fabric materials; (ii) untreated non-woven fabric materials; (iii) polymeric materials, including staple fibers and particles; and (iv) fluff, a natural and/or synthetic cotton-like material that is generally a fibrous mass of natural and/or synthetic fibers, intertwined and entangled to form a cohesive unit of fibers and held together by interfacial friction and surface energy.

10. The engineered surface of claim 9, wherein the sand and fiber blend material is incorporated into a substrate as a soil amendment.

11. The engineered surface of claim 9, wherein the engineered surface further comprises a drainage underlayer or aggregate layer.

12. The engineered surface of claim 9, wherein the engineered surface comprising about 50-90 percent by weight of a substrate blend and about 10-50% by weight of the fiber blend material.

13. The engineered surface of claim 9, wherein the fiber blend material comprises 0.1-0.8 pounds of fiber blend material per square foot of soil surface and the sand comprises 1-10 pounds of subangular sand per square foot of substrate surface.

14. A method of creating an engineered surface comprising:
shaving down the existing substrate or soil surface in order to level and remove existing vegetation;
apply 0.1-0.8 pounds of SAP fiber blend per square foot of soil surface;
applying 1-10 pounds of subangular sand per square foot of substrate surface; and
smoothing the material until desired base consistency is achieved.

15. The method of claim 14, wherein the method further comprises compacting the surface to achieve a desired level of compaction.

16. The method of claim 14, wherein the method further comprises applying a pre-emergent herbicide over the finished base.

17. A mixed turf assembly comprising:
an engineered surface comprising: (i) superabsorbent polymer (SAP) coated non-woven fabric materials; (ii) untreated non-woven fabric materials; (iii) polymeric materials, including staple fibers and particles; and (iv) fluff, a natural and/or synthetic cotton-like material that is generally a fibrous mass of natural and/or synthetic fibers, intertwined and entangled to form a cohesive unit of fibers and held together by interfacial friction and surface energy; and
mixed turf arranged on the engineered surface and comprising: a synthetic turf and natural grass arranged in the synthetic turf, the synthetic turf, comprising: synthetic filaments configured to simulate grass blades and a backing consisting of a membrane supporting the synthetic filaments, the mixed turf wherein the backing is substantially draining and enables transpiration and permits the passage therethrough of the roots of the natural grass, the backing is non-biodegradable.

18. The mixed turf assembly of claim 17, further comprising:
an upper layer, comprising sand and arranged on top of the backing,
a lower layer configured to support the backing and which comes into contact with the backing and with the upper layer, and
a substrate bordering on the lower layer.

19. The mixed turf assembly of claim 18, wherein the substrate comprises a drainage system consisting of trenches, comprising: perimeter headers arranged around the perimeter of the soil, secondary drainage means extending over the soil, and at least partly joining different parts of the perimeter headers.

20. The method of claim 3, wherein the engineered surface is created by in situ mixing of the ingredients of the fiber blend holding material into the soil along with a particulate composition for use as a sport or recreational surface comprising about 50-90 percent by weight of the particulate composition and about 10-50% by weight of the fiber blend holding material.

* * * * *